(12) United States Patent
Torrecilla et al.

(10) Patent No.: US 12,347,340 B2
(45) Date of Patent: Jul. 1, 2025

(54) SYSTEMS AND METHODS TO SIMULATE ROBOTIC JOINING OPERATIONS

(71) Applicant: SEABERY NORTH AMERICA, INC., Annapolis, MD (US)

(72) Inventors: Pedro Gerardo Marquinez Torrecilla, Annapolis, MD (US); Francisco Jose Diaz Cano, Huelva (ES)

(73) Assignee: SEABERY NORTH AMERICA, INC., Annapolis, MD (US)

( * ) Notice: Subject to any disclaimer, the term of this patent is extended or adjusted under 35 U.S.C. 154(b) by 0 days.

(21) Appl. No.: 16/978,128

(22) PCT Filed: Mar. 7, 2019

(86) PCT No.: PCT/IB2019/000265
§ 371 (c)(1),
(2) Date: Sep. 3, 2020

(87) PCT Pub. No.: WO2019/171178
PCT Pub. Date: Sep. 12, 2019

(65) Prior Publication Data
US 2021/0012678 A1 Jan. 14, 2021

(30) Foreign Application Priority Data

Mar. 7, 2018 (EP) .................................... 18382147
Mar. 8, 2018 (EP) .................................... 18382152

(51) Int. Cl.
*G09B 9/00* (2006.01)
*G09B 19/24* (2006.01)
*G09B 25/02* (2006.01)

(52) U.S. Cl.
CPC .............. *G09B 9/00* (2013.01); *G09B 19/24* (2013.01); *G09B 25/02* (2013.01)

(58) Field of Classification Search
CPC ........... G09B 19/24; G09B 9/00; G09B 25/02
See application file for complete search history.

(56) References Cited

U.S. PATENT DOCUMENTS 5,621,672 A * 4/1997 Kobayashi ......... G05B 19/4141
901/42
9,811,074 B1 * 11/2017 Aichele .................. B25J 9/1656
(Continued)

FOREIGN PATENT DOCUMENTS

| EP | 2863376 | 4/2015 | |
| KR | 20170049990 | * 5/2017 | ............. G09B 19/24 |
| SE | 531104 | * 12/2002 | ......... G05B 19/4207 |

OTHER PUBLICATIONS

International Search Report and Written Opinion corresponding to International Patent Application No. PCT/IB2019/000265, mailed Jul. 12, 2019.

(Continued)

*Primary Examiner* — Robert J Utama
*Assistant Examiner* — Correll T French
(74) *Attorney, Agent, or Firm* — Hayes Soloway P.C.

(57) ABSTRACT

Systems and methods to simulate robotic joining operations are disclosed. An example system to simulate a robotic application includes: an image sensor configured to capture images of a physical simulation workpiece and a physical simulation welding torch manipulated by a robotic arm during welder during a simulated operation; and a simulator configured to: calculate a simulated result based on the captured images and based on communications output by the robotic arm; and output a visual representation of the simulated result.

17 Claims, 28 Drawing Sheets

(56) References Cited

U.S. PATENT DOCUMENTS

| | | | |
|---|---|---|---|
| 2002/0120921 A1* | 8/2002 | Coburn | G05B 19/41885 703/21 |
| 2011/0108536 A1* | 5/2011 | Inada | B23K 9/127 219/130.1 |
| 2011/0183304 A1* | 7/2011 | Wallace | G09B 19/24 434/234 |
| 2013/0040270 A1* | 2/2013 | Albrecht | B23K 9/0953 434/234 |
| 2013/0183645 A1 | 7/2013 | Wallace et al. | |
| 2014/0017642 A1 | 1/2014 | Postlethwaite | |
| 2015/0206341 A1 | 7/2015 | Loper | |
| 2016/0078683 A1 | 3/2016 | Sudol | |
| 2016/0214200 A1* | 7/2016 | Beeson | A61F 9/064 |
| 2016/0267806 A1* | 9/2016 | Hsu | B23K 9/0956 |
| 2017/0200395 A1* | 7/2017 | Albrecht | G06F 3/0488 |
| 2018/0095640 A1* | 4/2018 | Albright | B23K 9/0953 |
| 2019/0375101 A1* | 12/2019 | Miyata | B23K 31/02 |

OTHER PUBLICATIONS

Anonymous: "AugmentedArc (TM) Augmented Reality Welding System", May 30, 2017, pp. 1-4, XP055501429.

H.C. Fang et al.: "Robot Path and End-Effector Orientation Planning Using Augmented Reality", Procedia Cirp, vol. 3, Jan. 1, 2012, pp. 191-196, XP055503026.

Anonymous: "Polygon mesh—Wikipedia", Sep. 24, 2017, pp. 1-10, XP055502156.

White, SA, Prachyabrued, M., Chambers, T. L. et al. Low-cost simulated MIG welding for advancement in technical training. Virtual Reality 15, 69-81 (2011). https://doi.org/10.1007/s10055-010-0162-x (Year: 2011).

A. Schilling, Jens Basanow, A. Zipf, Vector based Mapping of Polygons on Irregular Terrain Meshes for Web 3D Map Services, Published in WEBIST 2007 (Year: 2007).

European Search Report Appln No. 18382150 dated Aug. 27, 2018.

Juihuei Yao et al., "Concept of creation of an improved artificial intelligence system and computerized trainer for virtual welding", The Paton Welding Journal, vol. 2017, No. 6, Jun. 28, 2017, pp. 19-26, XP055501436.

Wang et al. "AprilTag 2: Efficient and robust fiducial detection" 2016 IEEE/RSJ International Conference on Intelligent Robots and Systems (IROS) Daejeon Convention Center Oct. 9-14, 2016, Daejeon, Korea (Year: 2016).

Non-Final Office Action U.S. Appl. No. 16/978,132 dated Aug. 3, 2021.

Non-Final Office Action U.S. Appl. No. 16/978,131 dated Feb. 16, 2022.

* cited by examiner

SYSTEMS AND METHODS TO SIMULATE ROBOTIC JOINING OPERATIONS

BACKGROUND

This disclosure relates to virtual training and, more particularly, to systems and methods to simulate robotic joining operations.

Conventional systems and methods for simulating joining operations, such as welding, brazing, adhesive bonding, and/or other joining operations, require substantial use of graphical processing units (GPUs) to perform the simulation. In conventional weld simulation systems, the calculations and rendering of the simulated weld bead require substantial computational power, thereby limiting the platforms on which such simulation could be effectively implemented. For instance, mobile devices and/or web browsers could not implement conventional simulation. Furthermore, conventional weld simulation systems and methods are cumbersome, and present difficulties for development of new features and functionality such as complex welding shapes and/or simulation of different welding materials.

In conventional weld simulation, the amount of material transferred from the filler (such as the electrode for SMAW welding processes) to the weld bead cannot be accurately modeled. Accurate modeling is important for simulating root passes in multi-pass welding, because the root pass lays a foundation for the rest of the passes. When there is no separation between welded parts, the root pass fills up too much space. In many cases, the bead geometry can be either too convex or too concave, making the subsequent passes fit poorly. Weaved welds can produce beads that appear too flat. If welding is executed at the same place (i.e., without substantially advancing the torch or welding gun), the weld bead can grow vertically. In some occasion, there may be no transition between the coupon and weld bead. For example, the bead looks like it was glued to the coupon.

In conventional weld simulation, the melting of base workpiece material and/or underlying weld beads is very difficult to accurately simulate. In particular, conventional simulation of GTAW welding process suffers from lack of this capacity.

SUMMARY

Systems and methods to simulate robotic joining operations are disclosed, substantially as illustrated by and described in connection with at least one of the figures, as set forth more completely in the claims.

DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Figure 1:
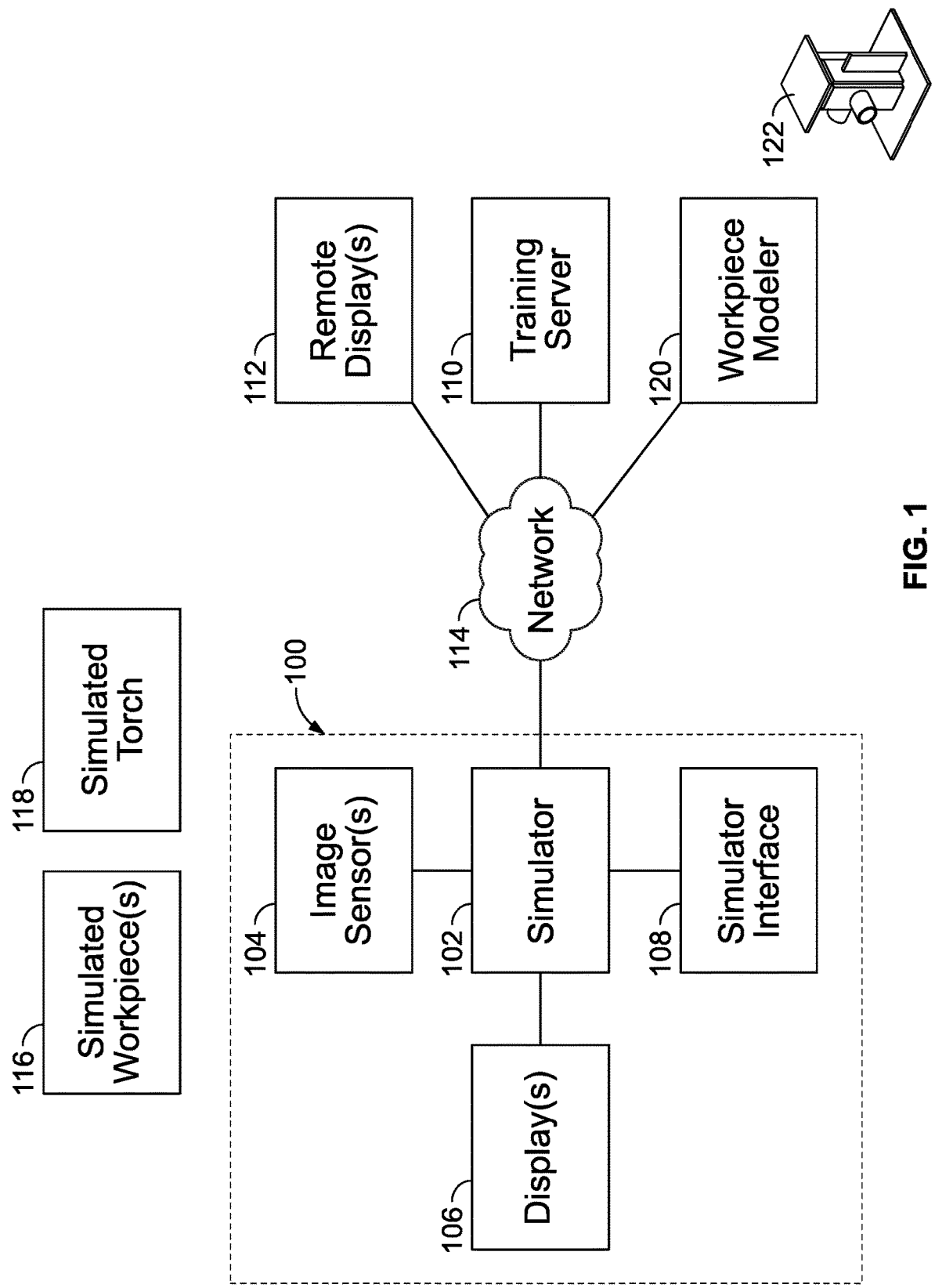
FIG. 1 is a block diagram of an example weld training system including simulation of a weld result based on monitoring training weld performance, in accordance with aspects of this disclosure.

Traditionally there are two ways to train operators and program robots for robot joining operations like welding: Teaching by demonstration and offline robots programming.

Teaching by demonstration is expensive because it involves welding or applying a polymer material to an expensive part. A large majority of the time, programming the robot by demonstration involves using a robot control pendant. However, moving the robot to precise coordinates is not as straightforward as with other methods. This is especially true with some joystick-based systems, where there is no way of entering a numerical value. The lack of precision can be especially problematic in the case of welding where precision is paramount. Therefore, teaching by demonstration can require significant trial and error and is therefore a very inefficient method.

In conventional offline programming, complete virtual models are not able to represent the real world with adequate accuracy. Programs developed offline may still need to be altered after they are applied to the real robot. In addition, offline programming takes longer overall. Although offline programming reduces the downtime of the robot, the programmer must spend extra time developing the simulation, as well as testing it on the real robot.

Disclosed example systems and methods provided a mixed-reality system that provides the advantages of both offline programming and teaching be demonstration. Example systems and methods disclosed herein provide the availability and realism of teaching the robot by demonstration and the efficiency of virtualizing the joining of the materials.

Example systems and methods disclosed herein involve presenting and modeling weld workpieces and weld beads in a simulated, augmented reality training environment. Examples of conventional systems, apparatuses, and methods for providing a simulated, augmented-reality training environment are described in U.S. patent application Ser. No. 14/406,228, filed as International Patent Application No. PCT/ES2013/070315 on May 17, 2013, entitled "Advanced Device for Welding Training, Based on Augmented Reality Simulation, Which can be Updated Remotely." The entireties of U.S. patent application Ser. No. 14/406,228 and International Patent Application No. PCT/ES2013/070315 are incorporated herein by reference.

A disclosed example system for providing a simulated, augmented-reality, training environment includes: (1) an operating system that is capable of supporting 3D (three-dimensional) graphics and communications between users of a simulation software, (2) implementation of mathematical methods and/or algorithms that simulate welding processes in three dimensions, (3) software that manages a virtual classroom, and (4) an augmented reality application that simulates a welding process on a real work piece. By using augmented reality techniques, virtual images generated by a computer are overlapped or transposed onto real environments to define and/or create a mixed reality that provides users with a tool for learning different welding techniques. In some examples, the user (e.g., welder, weld trainee) uses a commercial or custom head-mounted display, video glasses, and/or any other user-worn display device. The display or glasses may be integrated into a commercial welding mask, and presents the mixed reality to a user that wears the welding mask.

Disclosed example systems and methods provide a simulated visual presentation of weld workpieces (also referred to herein as "coupons") and weld beads that realistically represents the executed weld bead. For example, such systems and methods can reproduce weld bead defects such that a user can visualize the defect and understand how and why it had occurred. As another example, such systems and methods can distinguish between different techniques used to form a weld and represent each weld differently.

Relative to conventional simulation of joining operations, disclosed systems and methods correctly calculate the amount of material transferred from the filler to the workpiece, adjust the concavity or convexity of the bead geometry to improve the accuracy of interaction between different passes, improve the representation of weaved welds, control unnatural growth resulting from lack of movement of the welding torch, provide an accurate transition between the coupon and weld bead, accurately simulate melting of base workpieces and underlying weld beads.

Disclosed example systems and methods substantially increase the efficiency of modeling and simulation of joining operations, thereby providing the capability to run on previously-unused mobile devices and/or web browsers having less computational power, and/or to be ported to substantially any platform. Disclosed systems and methods simplify the creation and implementation of later-developed features and functionalities, such as importation of custom welding workpieces and/or modeling of additional variables such as adding workpiece and/or filler materials.

Disclosed example systems and methods are modular, in that example systems and methods enable localized changes without affecting the whole geometry of the workpiece or welding result. Disclosed example systems and methods calculate weld bead geometry based on measured welding parameters in an iterative manner, for individual locations along the weld bead. Filler volume added during a simulation step is added to volume already present (e.g., from the original workpiece, from prior steps, etc.). Disclosed examples use mass-conserving techniques to accurately simulate volumes of deposited material.

Disclosed example systems and methods calculate the weld bead cross-section and the weld bead lateral profile separately (e.g., independently), and combine the cross-section and lateral profile calculates to determine a resulting volume. Unlike conventional weld training techniques, disclosed example systems and methods calculate and depict both welding bead surfaces and welding bead penetration into the workpiece. Depictions of the welding bead penetration may be shown using cross-sections of the welding bead at any slice location. Disclosed examples example simulation of GTAW welding without filler rod material, which can be particularly useful for simulating welding of thin sheets of metal.

Disclosed example computer-implemented systems and methods for simulation of joining materials with or without filler material include: processing circuitry; and a machine readable storage device storing machine readable instructions which, when executed by the processing circuitry, cause the processing circuitry to display a visual simulation of a three-dimensional joining operation within a simulation domain by simulating the simulation domain as a set of interconnected cross-sectional slices.

Some example computer-implemented systems and methods further include one or more image sensors configured to capture images of a physical workpiece and a physical joining tool corresponding to the joining operation, in which the instructions cause the processing circuitry to simulate the simulation domain based on the images. In some examples the instructions cause the processing circuitry to represent a joint result for a group of concatenated slices using one or more polygons and associated polygon data. In some such examples, the associated polygon data for the first one of the slices comprises at least one of: an indication of whether the polygon represents a workpiece, a joint filler bead, or auxiliary data; a joint pass number; joint defect data for the first one of the slices; pressure applied; time exposed to source or applied heat input for the first one of the slices.

In some examples, the instructions cause the processing circuitry to display a simulated joining material within a visualization of the simulation domain based on a location of the first one of the slices, the one or more polygons, and the associated polygon data. In some examples, the instructions cause the processing circuitry to display a result of the joining as a cross-section of a simulated workpiece and a simulated weld bead based on the simulated welding data for one of the slices corresponding to a location of the cross-section.

In some example systems and methods, the instructions cause the processing circuitry to define one or more simulation domains with reference to a workpiece, and to enable simulated joining of one or more joints within each of the simulation domains. In some examples, the instructions cause the processing circuitry to display a result of the joining (e.g., welding) operation for at least one of the slices from any perspective.

In some example systems and methods, the instructions cause the processing circuitry to store the simulation data as vector data representative of the joining operation based on the cross-sectional slices. In some such examples, the instructions cause the processing circuitry to render the workpiece and the joint filler bead based on the vector data for the cross-sectional slices. In some examples, the instructions cause the processing circuitry to render the workpiece and the joint filler bead by: generating a three-dimensional mesh based on the vector data; and mapping at least one of color information, surface type information, heat affected zone information, heat affected zone strength information, pressure applied, time exposed to source or weld puddle information to the three-dimensional mesh.

In some example systems and methods, the instructions cause the processing circuitry to calculate a volume of deposited material and determine the vector data for the cross-sectional slices based on the calculated volume. In some such example systems and methods, the instructions cause the processing circuitry to calculate the volume of deposited material based on programmed simulation parameters. In some example systems and methods, the instructions cause the processing circuitry to calculate at least one of a surface geometry or a weld bead penetration for the cross-sectional slices, and include the at least one of the surface geometry or the weld bead penetration in the vector data for the cross-sectional slices.

In some example systems and methods, the instructions cause the processing circuitry to: define a weld joint within the simulation domain; define respective slice reference frames for the slices based on a joint reference frame of the weld joint; simulate the joining (e.g., welding) operation for the slices; and projecting simulation data from the slices onto the weld joint to visually simulate a weld bead resulting from the joining (e.g., welding) operation. In some examples, the instructions cause the processing circuitry to simulate the joining (e.g., welding) operation for each of the slices by determining a plurality of control points in each of the slices based on the joint parameters. In some such examples, the welding parameters include at least one of: weld bead width, weld bead height, weld bead convexity or concavity, reinforcement depth, penetration depth, reinforced area, penetrated area, or dilution factor.

In some examples, the instructions cause the processing circuitry to define one or more sequences within one or multiple simulation domains simultaneously or one after the other with in a working piece. In some example systems and methods, the instructions cause two or more processors to define the same workpiece and simulate separate joining (e.g., welding) operations on different simulation domains simultaneously. In some example systems and methods, the instructions are configured to cause the processing circuitry to display the visual simulation as a mixed reality display or an augmented reality display, in which only information associated with the simulation domain is rendered for display over a captured image. In some examples, the instructions cause the processing circuitry to simulate the cross-sectional slices as two-dimensional cross-sections of a joining operation being simulated.

Disclosed example computer-implemented systems and methods for simulation of joining materials, with or without filler material, include: processing circuitry; and a machine readable storage device storing machine readable instructions which, when executed by the processing circuitry, cause the processing circuitry to: simulate of a three-dimensional joining operation within a simulation domain; and display a cross-section of a simulated result of the simulated joining operation in response to receiving a selection of a location of the cross-section.

Some disclose example systems and methods to generate customized training workpieces for simulation based on physical real parts, includes: analyzing a three-dimensional model of a physical part to determine a number of visual markers as needed and a placement of the visual markers on the physical part, the number and the placement of the visual markers being based on the geometry of the physical part;

and generating physical markers representative of the determined visual markers for attachment to the physical part based on the determined placement of the visual markers.

In some example systems and methods, the markers include machine readable codes, and the generating of the physical markers includes selecting the visual markers to represent codes having Hamming distances meeting at least a lower threshold. Some example systems and methods further include determining a trajectory of at least one or more simulated joining operations to be performed, the number and the placement of the visual markers being based on the one or more simulated joining operations. In some such examples, the analyzing of the three-dimensional model includes determining the number of the visual markers, the sizes of the visual markers, and the placement of the visual markers based on a ratio between 20 square centimeters of visual markers per 1 centimeter of training weld length and 30 square centimeters of visual markers per 1 centimeter of training weld length. Some such example systems and methods further include determining respective sizes of the visual markers based on distances between the visual markers and the one or more simulated joining operations.

In some example systems and methods, the analyzing of the three-dimensional model includes determining second markers configured to increase an upper viewing distance limit of the physical part. In some examples, the analyzing of the three-dimensional model includes determining the number of markers that are simultaneously visible on the physical part based on an upper limit of simultaneously visible markers. In some example systems and methods, the analyzing of the three-dimensional model includes determining the placement of the visual markers based on a curvature of the physical part.

In some example systems and methods, the analyzing of the three-dimensional model includes omitting one or more stickers based on an object present on the physical part that would interfere with placement of the one or more stickers. In some examples, the generating of the physical markers includes printing stickers of the visual markers. Some example systems and methods further include generating placement instructions for attaching the physical markers to the physical part. In some example systems and methods, the analyzing of the three-dimensional model includes determining the number of the visual markers and the placement of the visual markers to provide a marker detection time of less than an upper threshold time by marker detection equipment.

Some example systems and methods further include generating weld training instructions based on a weld procedure specification corresponding to the physical part. Some example systems and methods further include determining a location of at least one or more surfaces on which simulated painting operations are to be performed on the physical part, the number and the placement of the visual markers being based on the one or more surfaces. In some example systems and methods, analyzing of the three-dimensional model includes determining the number of the visual markers, the sizes of the visual markers, and the placement of the visual markers based on a ratio between 1 square centimeters of visual markers per at least 5 square centimeter of the one or more surfaces, and 5 square centimeters of visual markers per at least 5 square centimeter of the one or more surfaces. Some examples, further include determining respective sizes of the visual markers based on distances between the visual markers and the one or more surfaces.

Disclosed example computer-implemented systems and methods for generating customized workpieces for a mixed-reality simulation include: a processor; and a machine readable medium coupled to the processor and storing machine readable instructions which, when executed, cause the processor to: analyze a three-dimensional model of a physical part to determine a number of visual key points and a placement of the visual markers on the proposed weld training workpiece, the number and the placement of the visual markers being based on a geometry of the physical part; and generate physical markers representative of the determined visual markers for attachment to the physical part based on the determined placement of the visual markers.

Disclosed example computer-implemented systems and methods for generating customized spray paint training workpieces include a processor; and a machine readable medium coupled to the processor and storing machine readable instructions which, when executed, cause the processor to: analyze a three-dimensional model of a spray paint training workpiece to determine a number of visual key points and a placement of the visual markers on the proposed spray paint training workpiece, the number and the placement of the visual markers being based on a geometry of the spray paint training workpiece; and generate physical markers representative of the determined visual markers for attachment to the spray paint training workpiece based on the determined placement of the visual markers.

Disclosed example systems and methods to simulate a robotic application include an image sensor configured to capture images of a physical simulation workpiece and a physical simulation implement manipulated by a robotic arm during a simulated operation; and a simulator configured to: calculate a simulated result based on the captured images and based on communications output by the robotic arm; and output a visual representation of the simulated result.

In some example systems and methods, the simulator determines one or more weld parameters based on interpreting visual markers in the captured images, and calculates the simulated result based on the one or more weld parameters. In some examples, the simulator determines one or more parameters based on the communications output by the robotic arm. Some example systems and methods further include a robot interpreter to convert communications from the robotic arm to a simulator communication format. In some such examples, the communications from the robotic arm include a standardized field bus format.

Some example systems and methods further include a robot controller to program the robot to execute the simulated welding operation. In some examples, the simulator is configured to calculate the simulated result for discrete slices of a simulation domain, the discrete slices comprising respective cross-sections of the simulated workpiece. In some examples, the simulator is coupled to the robotic arm using a welding power supply interface of the robotic arm. In some example systems and methods, the simulator generates a visualization of the workpiece and a joint on the workpiece, at least one of during the simulated operation in a mixed reality environment or after the simulated operation in a fully digitalized environment. In some such examples, the simulator is configured to transmit the simulated result to a remote device configured to provide a different perspective of the workpiece and the joint based on the simulated result. In some examples, the simulated operation includes a simulated welding operation. In some examples, the simulated operation includes a simulated joining operation. In some examples, the simulated operation comprises a simulated spray painting operation.

Disclosed example systems and methods to simulate a robotic application include: capturing, with one or more image sensors, images of a physical simulation workpiece and a physical simulation welding torch manipulated by a robotic arm during a simulated operation; calculating, with a processor, a simulated result based on the captured images and based on communications output by the robotic arm; and outputting a visual representation of the simulated result.

Disclosed example systems and methods to simulate a robotic application include an image sensor configured to capture images of a physical simulation workpiece and a physical simulation implement manipulated by a robotic arm during a simulated operation; a simulator configured to: calculate a simulated result based on the captured images and based on communications output by the robotic arm; and transmit the simulated result; and a computing device configured to: receive the simulated result; and generate a visualization of the simulated result using at least one of the images captured by the image sensor or second images captured by the computing device.

FIG. 1 is a block diagram of an example weld training system 100 including simulation of a weld result based on monitoring training weld performance. The example weld training system 100 may be used to provide weld training to welding students and/or operators on multiple different types of workpieces. The example system 100 may be adapted to perform simulation and display of other types of workpiece joining techniques, such as brazing or adhesive bonding. For clarity and brevity, examples below are described with reference to welding.

The example weld training system 100 includes a simulator 102, one or more image sensor(s) 104, one or more display(s) 106, and a simulator interface 108. The example weld training system 100 may communicate with a training server 110 and/or one or more remote display(s) 112, such as via a network 114.

The simulator 102 receives data from the image sensor(s) 104, the simulator interface 108, and/or the training server 110. The simulator 102 generates and simulates a simulation domain as a set of interconnected, cross-sectional two-dimensional slices of the simulation domain. By simulating the two-dimensional slices, the simulator 102 generates and displays a three-dimensional welding operation within the simulation domain.

The simulator 102 may focus the simulation only within the simulation domain, which may be defined by one or more simulated workpiece(s) 116.

The image sensor(s) 104 generate images for use by the simulator 102 in determining weld parameters and/or recognizing a perspective of a welder. For example, the image sensor(s) 104 may be positioned and/or oriented to obtain stereoscopic images representative of a field of view of the welder so as to enable augmented reality images to be generated from the captured image(s) and the simulation. For example, the image sensor(s) 104 and one or more display(s) 106 may be positioned on a welding helmet worn by the welder. When the welder looks at the simulated workpiece(s) 116, the image sensor(s) 104 capture a same or similar view as would be viewed by the welder through a typical welding helmet lens.

The example weld training system 100 may include one or more additional displays, which may be positioned to be viewed by others besides the welder, such as an instructor. In some examples, the additional display(s) 106 display the same augmented reality view seen from the perspective of the welder. In some other examples, the display(s) 106 show weld parameters, weld training exercise information, and/or any other weld training information.

As described in more detail below, the simulated workpiece(s) 116 and a simulated torch 118 used for weld training exercises are provided with markers that are recognizable by the weld training system 100. The image sensor(s) 104 observe the markers when the markers are within the field of view of the image sensor(s) 104. Each of the markers contains unique data that enables rapid identification of the marker's identity, determination of the location of the marker on the simulated workpiece 116 or simulated torch 118 (e.g., via a marker-to-workpiece map or marker-to-torch map), and/or orientation of the marker for determination of the perspective of the image sensor(s) 104.

The simulator interface 108 includes one or more input devices, such as dials, knobs, buttons, switches, and/or any other type of input device, to enable entry of instructions or data into the simulator 102. For example, the simulator interface 108 enables selection of a predetermined weld training program, programming of weld parameters, selection of the simulated workpiece 116, identification of the welder or other user, and/or any other setup of the simulator 102.

As described in more detail below, disclosed example weld simulation involves defining and managing multiple slices of a welding domain to track the structure and/or shape of a weld bead or other welding result, and rendering a simulated weld bead based on the data associated with the slices.

The example weld training system 100 of FIG. 1 may receive customized workpiece data from a workpiece modeler 120. The example workpiece modeler 120 of FIG. 1 generates customized training workpieces for simulation based on a real physical part 122, and provides data representative of the customized training workpieces to the weld training system 100. The data representative of the customized training workpieces may include workpiece geometry data (e.g., a set of points and/or functions defined with reference to a workpiece reference frame or a simulation domain), a layout file specifying the layout of markers on the physical part, weld procedure specifications for performing sequences of training welds on the physical part, and/or weld trajectory definitions identifying the locations of training welds to be performed on the physical part.

Figure 2:
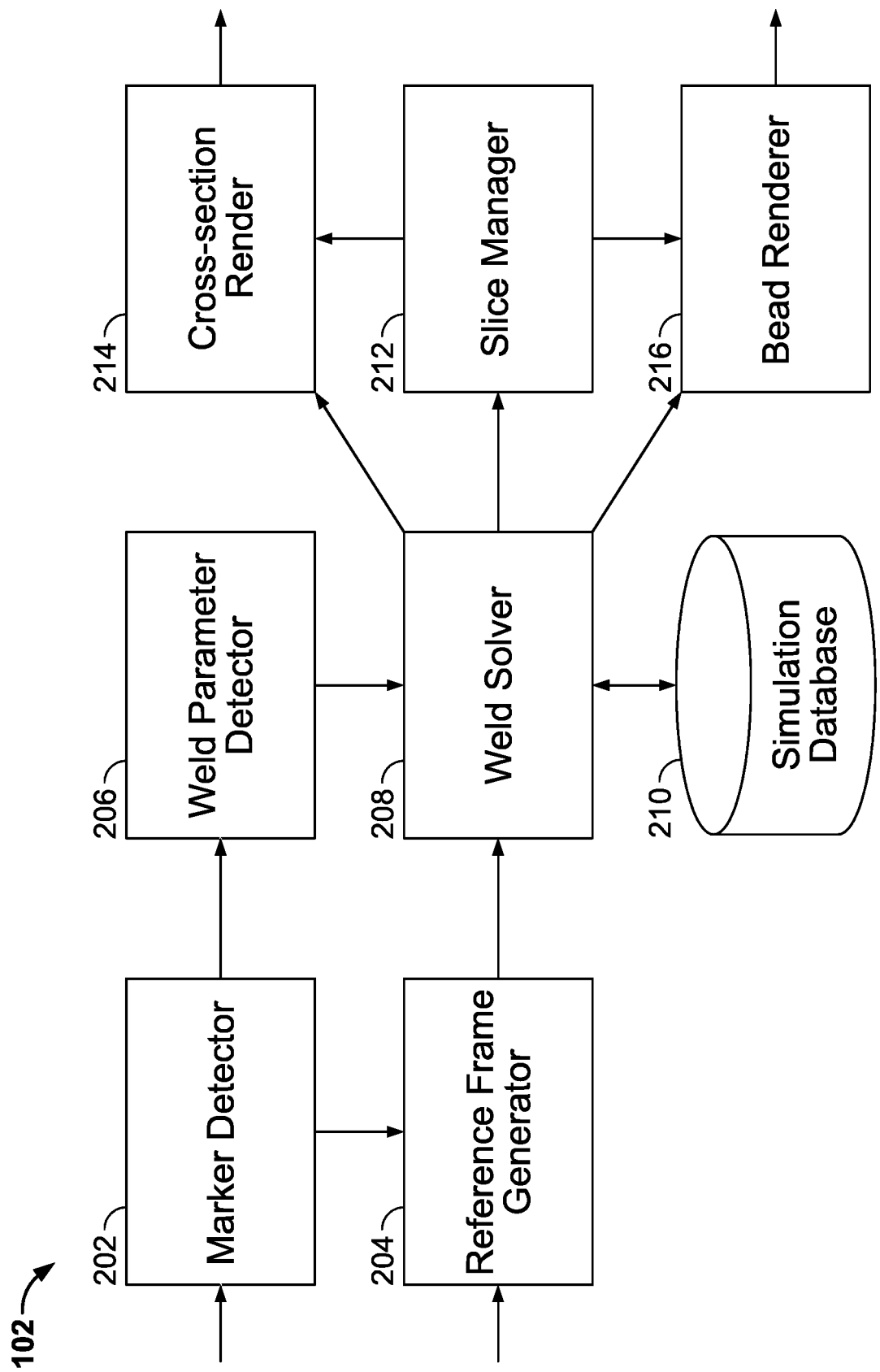
FIG. 2 is a block diagram of an example implementation of the simulator of FIG. 1.

FIG. 2 is a block diagram of an example implementation of the simulator 102 of FIG. 1. The simulator 102 receives images from the image sensor(s) 104 and/or receives weld parameters from the simulator interface 108 and/or from the training server 110. The example simulator 102 includes a marker detector 202, a reference frame generator 204, a weld parameter detector 206, a weld solver 208, a simulation database 210, a slice manager 212, a cross-section renderer 214, and a bead renderer 216.

Figure 3A:
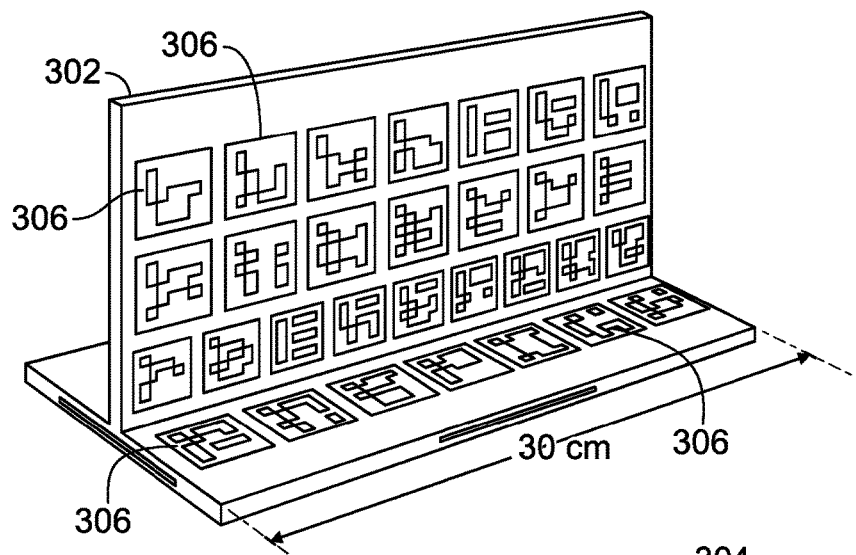
FIGS. 3A and 3B illustrate example physical workpieces with markers that are recognizable by the marker detector of FIG. 2, in accordance with aspects of this disclosure.
Figure 3B:
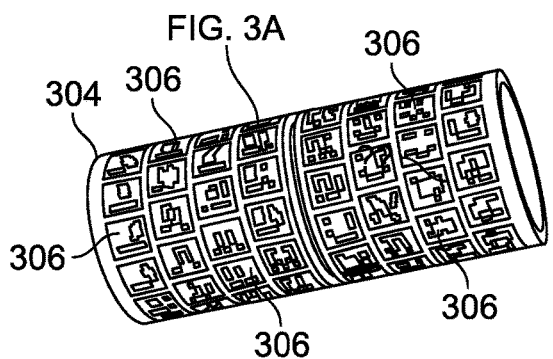
Figure 3B:
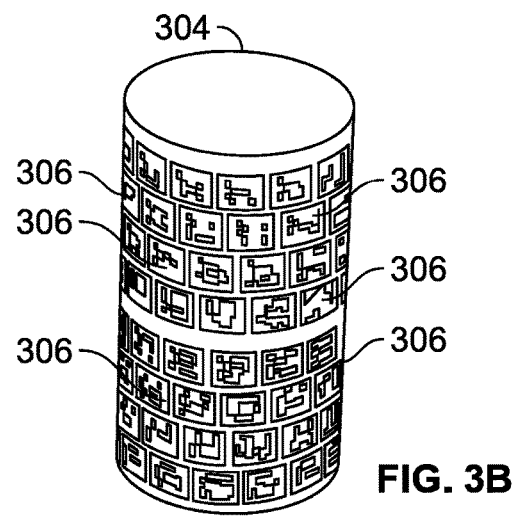
Figure 4:
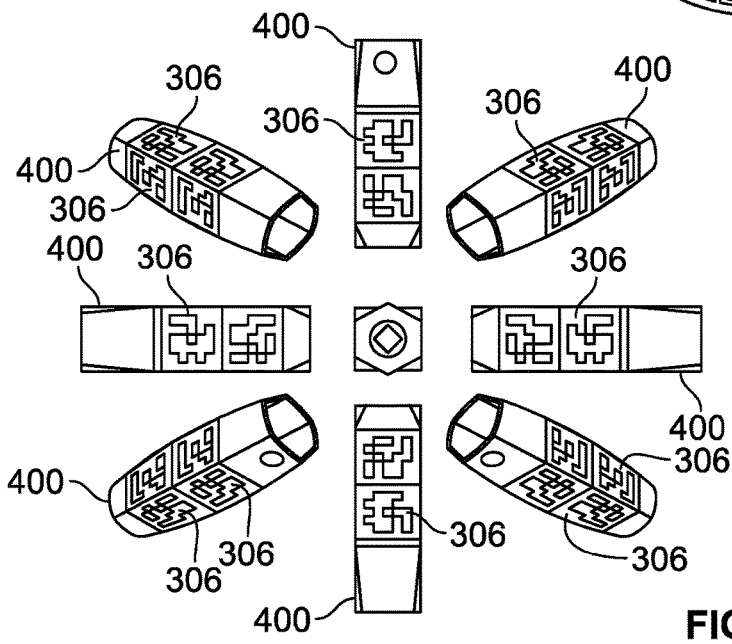
FIG. 4 illustrates multiple views of an example physical training torch with markers that are recognizable by the marker detector of FIG. 2, in accordance with aspects of this disclosure.
Figure 3C:
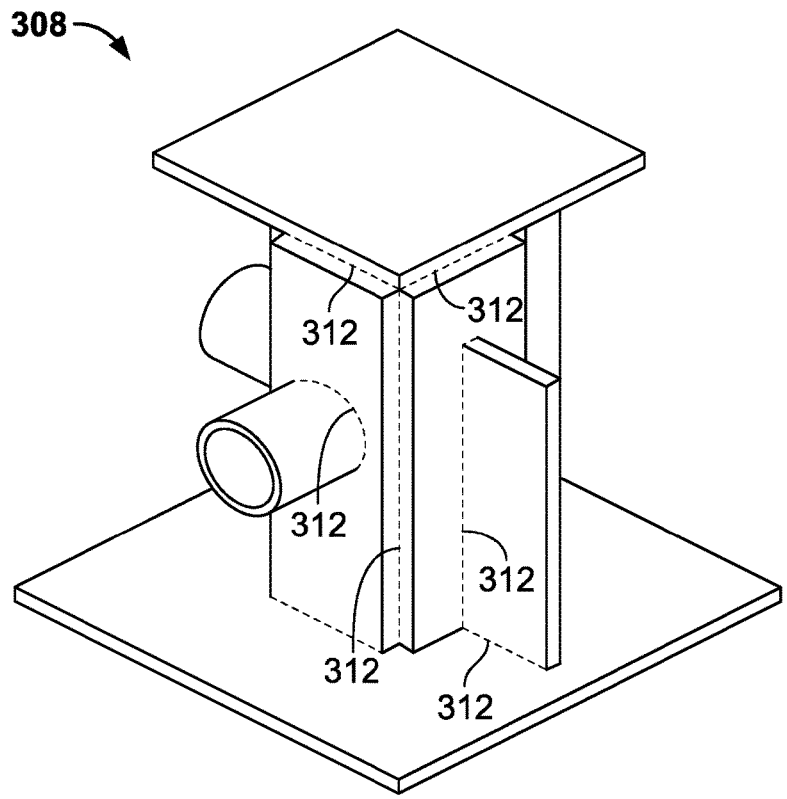
FIGS. 3C-3G illustrate example custom parts that may be provided with markers for simulation using the weld training system of FIG. 1.
Figure 3D:
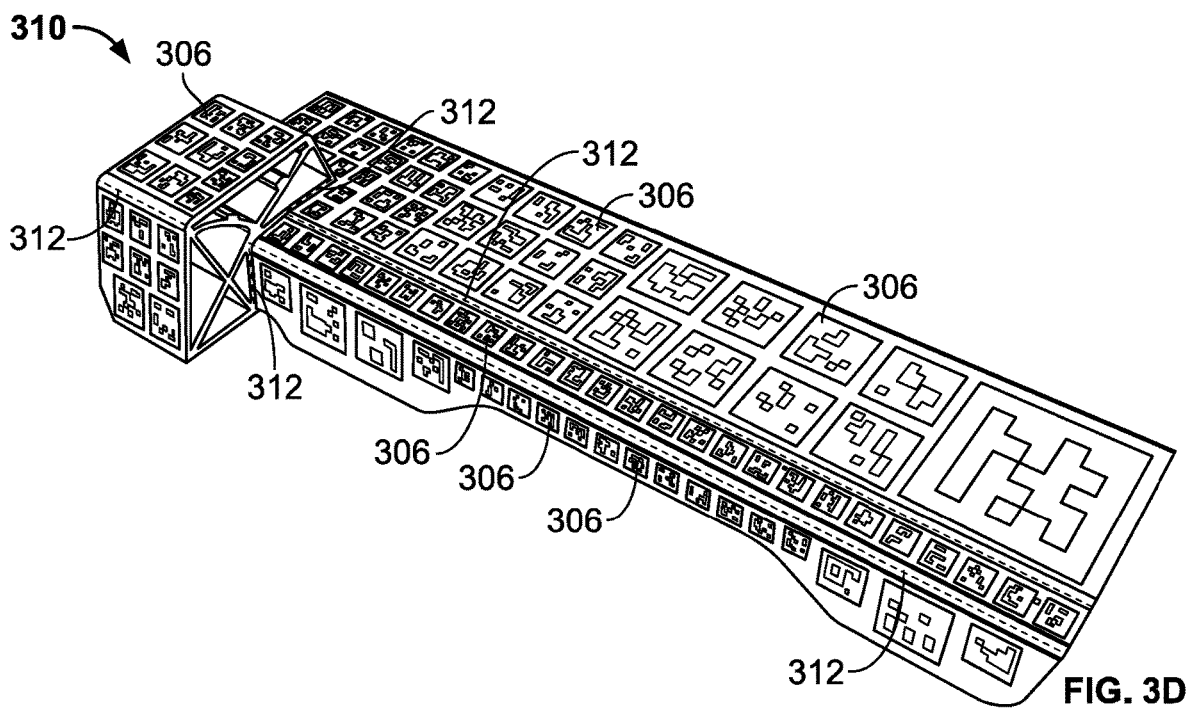
Figure 3E:
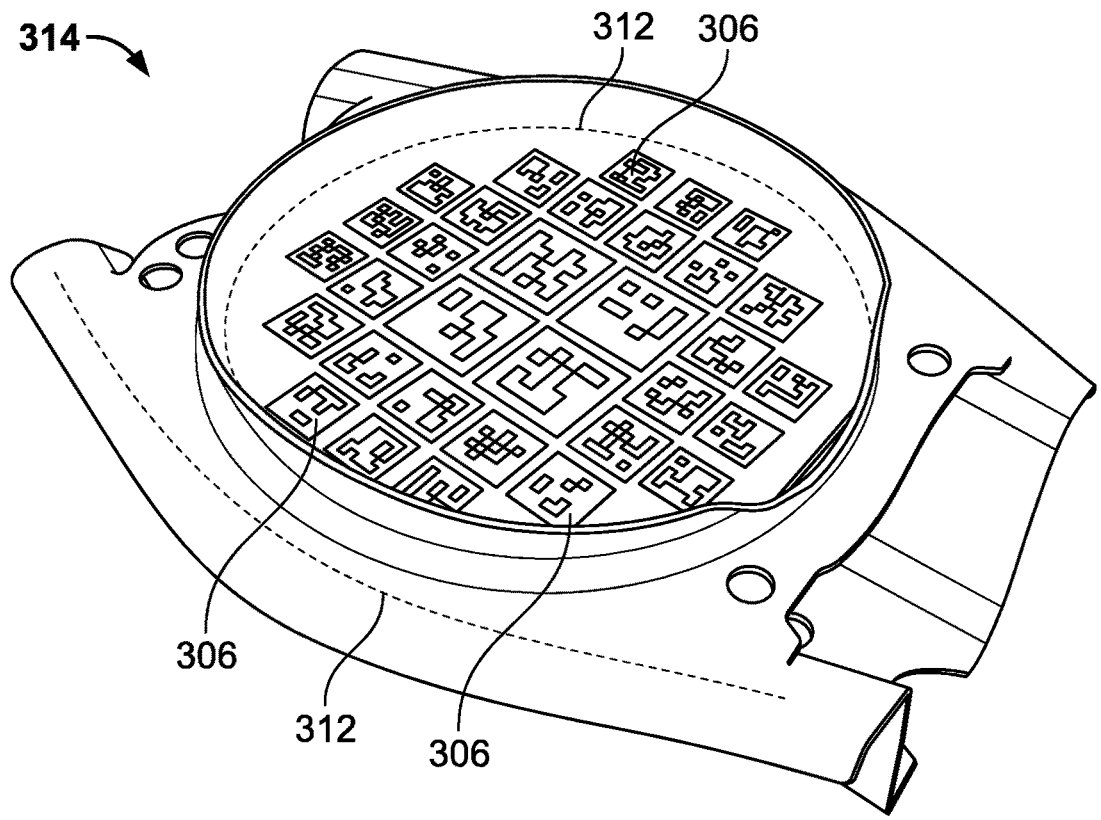
Figure 3F:
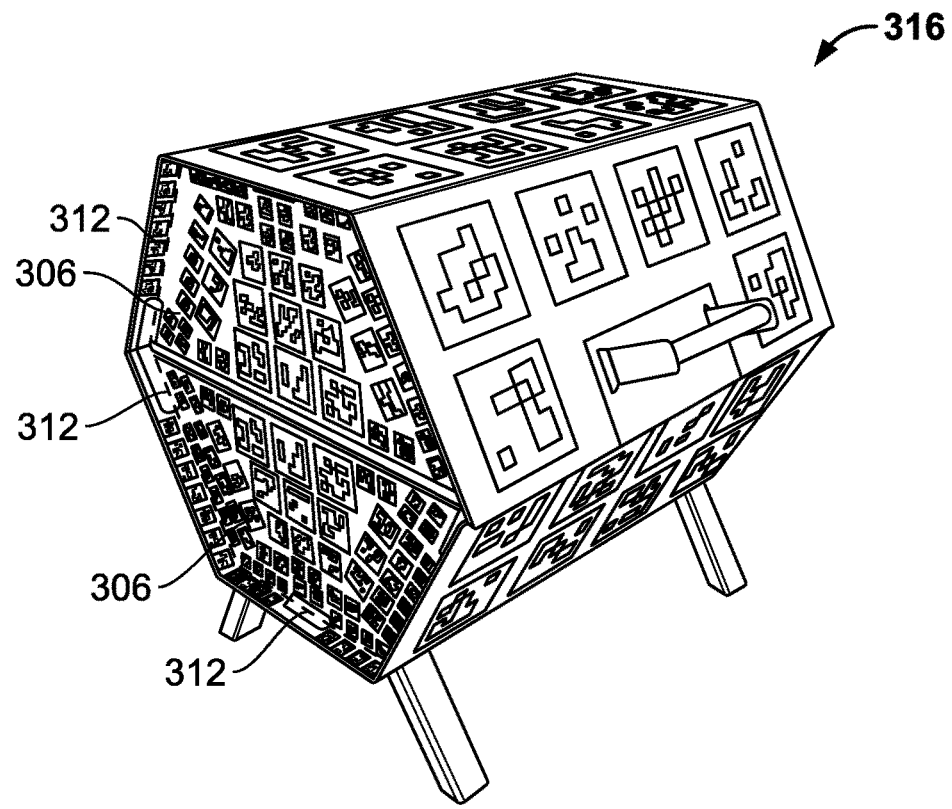
Figure 3G:
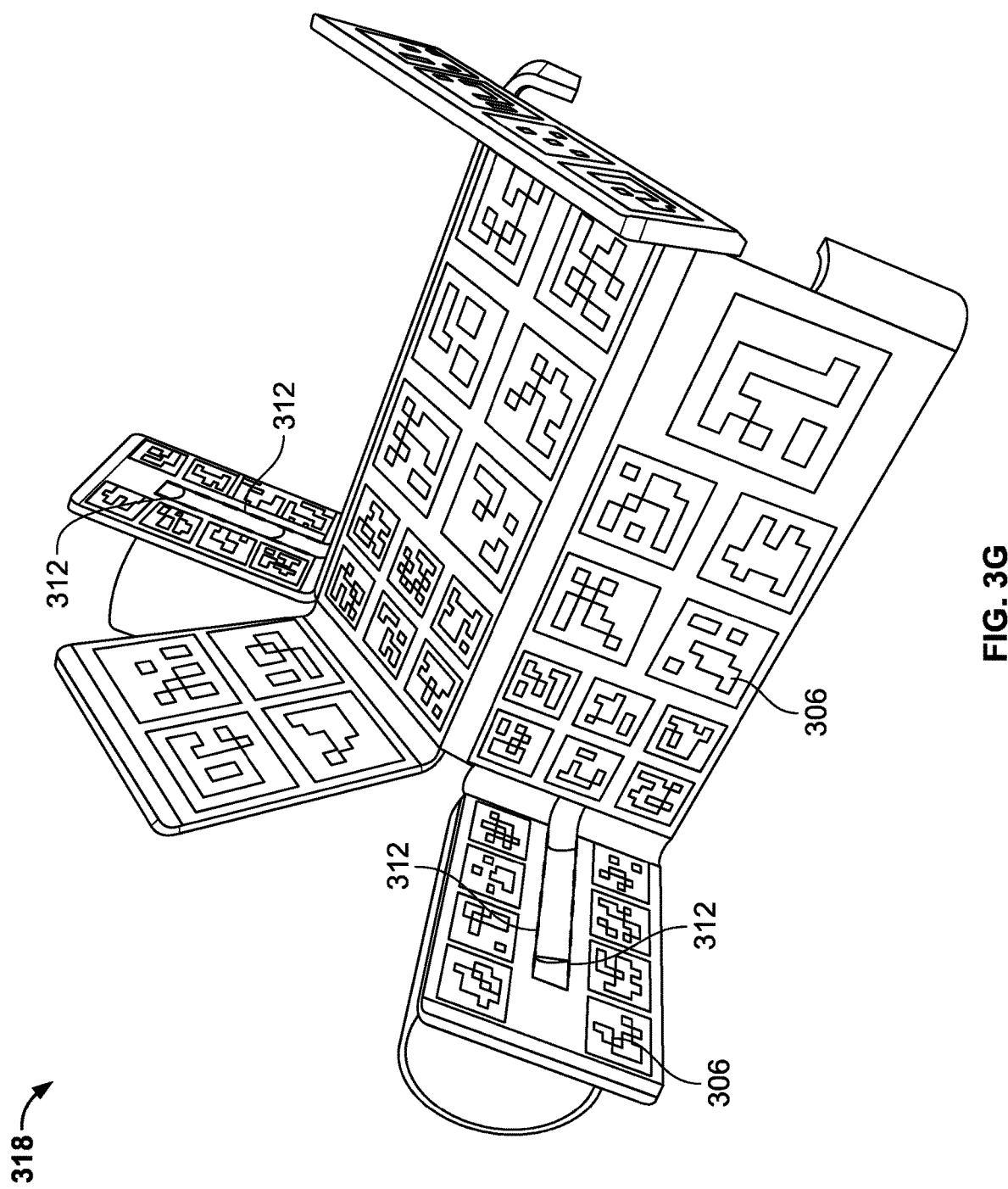

The marker detector 202 analyzes images generated by the image sensor(s) 104 to detect markers present in the images. The markers indicate the location and/or orientation of the simulated workpiece(s) 116 and/or the simulated torch 118 relative to the image sensor(s) 104 (e.g., relative to the welder's point of view). FIGS. 3A and 3B illustrate example physical workpieces 302, 304 with markers 306 that are recognizable by the marker detector 202. FIG. 4 illustrates multiple views of an example physical training torch 400 with markers 306 that are recognizable by the marker detector 202. Each of the markers 306 of FIGS. 3A, 3B, and 4 is unique and has a known size. The markers 306 are mapped to predetermined positions on the simulated workpiece(s) 116 or the simulated torch 118. By identifying one or more of the markers 306 within an image, the marker detector 202 can determine the portion of the workpiece(s) 116 and/or the torch 118 that are visible, the distance from the image sensor(s) 104 to the workpiece(s) 116 and/or the torch 118, the location and/or orientation of the torch relative to the workpiece(s) 116, and/or the orientation of the workpiece(s) 116 from the perspective of the image sensor(s) 104.

FIGS. 3C-3G illustrate example custom parts 308, 310, 314, 316, 318 that may be provided with markers to enable simulation using the weld training system 100 of FIG. 1. In contrast with conventional, standardized workpieces such as T-joints and pipe joints, the example custom parts 308, 310, 314, 316, 318 of FIGS. 3C-3G may have substantial complexity, including a variety of different types of shapes and joint trajectories. As described in more detail below, the custom parts 308, 310, 314, 316, 318 may be modeled in the simulator 102 using sets of points and/or mathematical functions within a simulation domain or workpiece reference frame.

Example joints 312 that may be defined for the custom parts 308, 310, 314, 316, 318 are illustrated in FIGS. 3C-3G. The joints 312 may be simulated in accordance with a weld procedure specification associated with the parts 308, 310, 314, 316, 318. As described in more detail below, the physical parts 122 corresponding to the custom parts 308, 310 may be provided with physical markers (e.g., the markers 306 of FIGS. 3A and 3B) to enable the simulator to determine the portions of the custom parts 308, 310, 314, 316, 318 that are being viewed at a given time.

Example joints that may be included in a custom part include, but are not limited to: for butt joints: single square grooves, single V-grooves, single U-grooves, flare V-grooves, and/or flanged butt joints; for T-joints: fillets, single bevel fillets, and/or flare bevel fillets, including dihedral angled joints; for lap joints: fillets, single bevel fillets, and/or J-bevel fillets; for corner joints: square groove outside corners, V-groove outside corners, fillet outside corners, U-groove outside corners, and/or edges on a flanged corner, which may include asymmetric bevels; for edge joints: square grooves, bevel grooves, V-grooves, J-grooves, U-Grooves, and/or flare V-grooves; pipe flare bevels for pipe-to-plate joints; plug welds; slot welds; surface welds; and/or welds using backing plates.

Returning to FIG. 2, the example marker detector 202 provides detection information to the reference frame generator 204 and to the weld parameter detector 206. The detection information may include the identities and/or characteristics of one or more identified markers.

Figure 5:
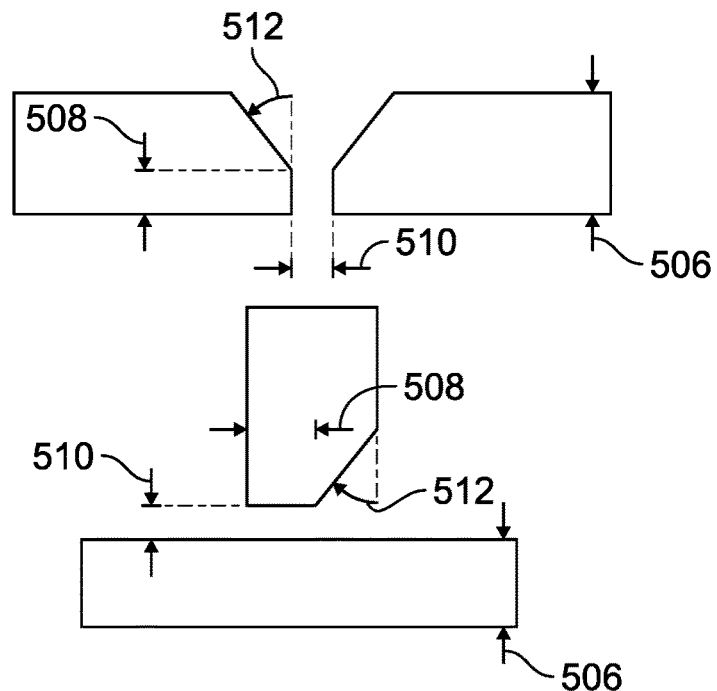
FIG. 5 illustrates cross sections of example workpieces and parameters that may be used by the example reference frame generator of FIG. 2 to define a workpiece, in accordance with aspects of this disclosure.

The reference frame generator 204 generates a reference frame for the weld solver 208 based on the workpiece(s) 106. For example, the reference frame generator 204 may use a coordinate system X, Y, Z that is defined with respect to the workpiece, which corresponds to the physical workpiece(s) 116. FIG. 5 illustrates cross sections of example workpieces 502, 504, and parameters that may be used by the example reference frame generator 204 of FIG. 2 to define a workpiece. The example reference frame generator 204 may define basic workpieces capable of mathematical extrusion using parameters such as plate thickness 506, root face thickness 508, root opening length 510, a bevel angle 512, and/or a bevel shape. Example bevel shapes include no cut, V-cut, U-cut, symmetric, and/or asymmetric. Additionally or alternatively, basic workpieces may be defined using a set of points within the coordinate system.

Figure 6:
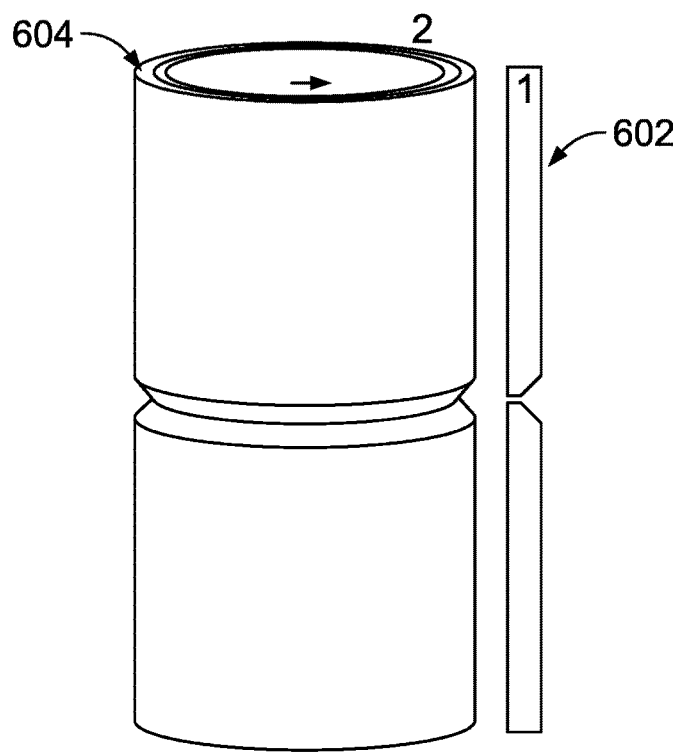
FIG. 6 illustrates an example extrusion of a workpiece cross-section that may be performed by the example reference frame generator of FIG. 2 to form a resulting workpiece.

The reference frame generator 204 may define a workpiece cross section using the parameters, and extrude the cross-section to define the full three-dimensional shape of the workpiece. FIG. 6 illustrates an example extrusion of a workpiece cross-section 602 that may be performed by the example reference frame generator 204 of FIG. 2 to form a resulting workpiece 604. In the example of FIG. 6, the reference frame generator 204 extrudes the groove-shaped cross-section 602 along a circle to form the pipe-shaped workpiece 604.

Figure 7:
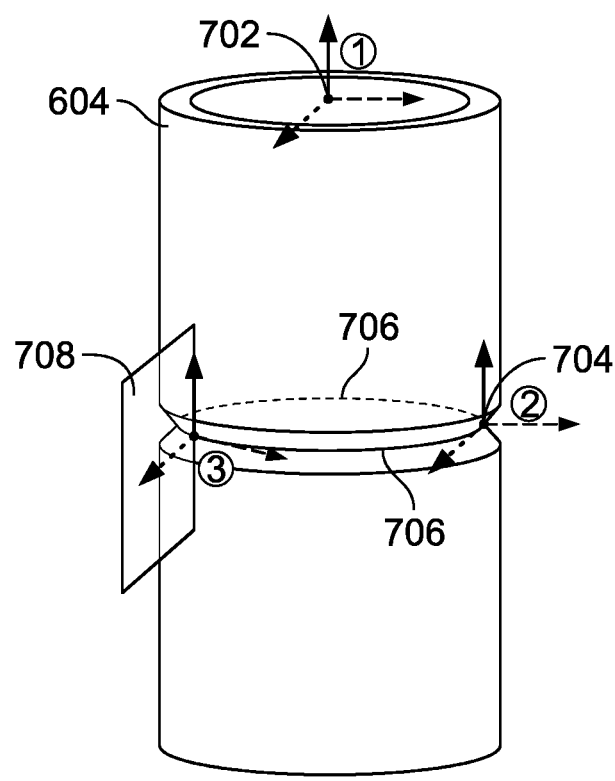
FIG. 7 illustrates an example reference frame that may be generated by the reference frame generator of FIG. 2 for the example workpiece of FIG. 6.

The reference frame generator 204 defines the workpiece with reference to a simulation domain and/or a workpiece reference frame. The workpiece reference frame may be a coordinate system, such as an X, Y, Z coordinate system having a designated point as the (0, 0, 0) origin point. The reference frame generator 204 defines other reference frames with respect to the workpiece reference frame (e.g., the simulation domain). FIG. 7 illustrates example reference frames that may be generated by the reference frame generator 204 for performing a simulation using the example workpiece 604 of FIG. 6. As illustrated in FIG. 7, the reference frame generator 204 defines a workpiece reference frame 702 with X, Y, and Z vectors. The workpiece reference frame 702 generates the workpiece 604 based on the workpiece reference frame 702. The workpiece reference frame 702 is absolute, in that none of the X, Y, or Z vectors change during simulation.

The reference frame generator 204 defines a weld joint reference frame 704 relative to the workpiece reference frame 702. A weld joint 706 is defined (e.g., based on a specified training weld, a weld procedure specification, etc.) within the workpiece reference frame 702, and the weld joint reference frame 704 is specified with reference to the weld joint 706. The example weld joint 706 goes around the circumference of the workpiece 604. In the example of FIG. 7, the local Y vector and/or the local X vector of the weld joint reference frame 704 may change with respect to the workpiece reference frame 702, while the local Z vector remains the same between the reference frames 702, 704. While one weld joint 706 and one weld joint reference frame 704 are shown in FIG. 7, the reference frame generator 204 may include any number of weld joints and corresponding weld joint reference frames.

The weld joint 706 is modeled using a number of slices that are perpendicular to the weld joint 706 at each point. The slices may be positioned at respective sampling intervals along the weld joint, and may be considered to be two-dimensional and/or to have a width equivalent to the distance between the sampling intervals. The reference frame generator 204 defines, for each of the slices, a slice reference frame 708. The slice reference frame 708 is defined with reference to the weld joint reference frame 704. As a result, the local X, Y, and/or Z vectors of the slice reference frame 708 may differ from the local X, Y, and/or Z vectors of the workpiece reference frame 702 and/or the weld joint reference frame 704. In the example of FIG. 7, for a given point along the weld joint 706, the local Y vector and/or the local X vector of the slice reference frame 708 may change with respect to the workpiece reference frame 702 and/or with respect to the weld joint reference frame, while the local Z vector remains the same between the reference frames 702, 704, 706.

Figure 8:
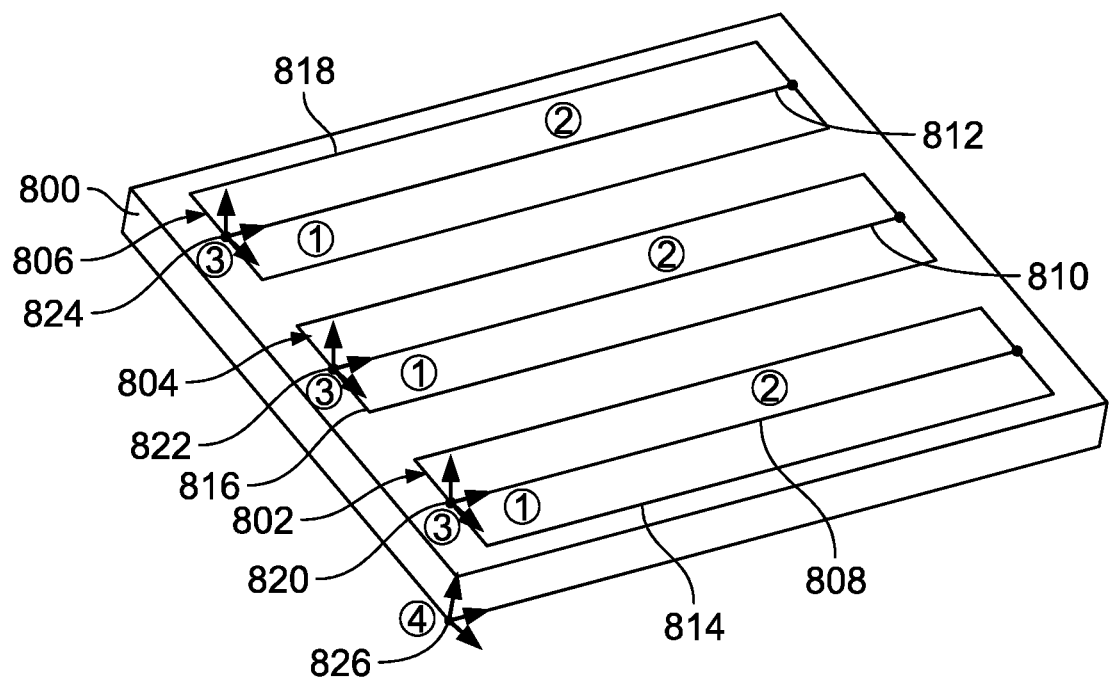
FIG. 8 illustrates an example reference frame that may be generated by the reference frame generator of FIG. 2 for an example plate-type workpiece.

FIG. 8 illustrates example of weld joints and corresponding weld joint reference frames that may be defined by the reference frame generator 204 of FIG. 2 for an example plate-type workpiece 800. To simulate welding of a workpiece, the reference frame generator 204 defines one or more weld joints 802, 804, 806 on the workpiece. For the purpose of simulation, the weld joints 802, 804, 806 are defined by joint trajectories 808, 810, 812 and joint zones 814, 816, 818.

Each of the joint trajectories 808, 810, 812 is a curve in three-dimensional space that defines the centerline of the joint 802, 804, 806. Joint trajectories can be expressed as simple mathematical expressions (e.g., a straight line, a circle, etc.), a polynomial function, a sequence of points, and/or any other technique. The joint zones 814, 816, 818 define the areas around the joint trajectories 808, 810, 812 that can be welded. In some examples, simulation is limited to the joint zones 814, 816, 818. One or more weld beads can be placed or performed within a weld joint 802, 804, 806 (e.g., one or more passes of a weld).

As illustrated in FIG. 8, multiple weld joints 802, 804, 806 can be defined on a workpiece. As illustrated in FIG. 7, looping weld joints can be defined, in which the entire circumference can be welded without a gap. The reference frame generator 204 can place weld joints anywhere on the workpiece. The reference frame generator 204 defines a weld joint reference frame 820, 822, 824, relative to a workpiece reference frame 826, for each of the weld joints 802, 804, 806.

Joint reference frames may be expressed as respective transformation matrices. The reference frame generator 204 defines transformations that map weld joint space (e.g., weld joint reference frames) to workpiece space (e.g., the workpiece reference frame), as well as inverse transformations from the workpiece space to the weld joint space. A simulation domain is created for each weld joint. The simulation domain is a data structure that contains the data for the simulation of welding of that weld joint. The simulation domain may be stored in, for example, the main computer memory (RAM) during execution of the simulation.

The reference frame generator 204 determines a transformation of a designated coordinate system (e.g., an X, Y, Z coordinate system) to the images. The bead renderer 216 determines, based on the detection information, the position and/or orientation of a simulation domain within the images. When rendering the weld bead (as discussed in more detail below), the bead renderer 216 renders the weld bead based on determining a location and/or orientation of the workpiece space within the image and applying the appropriate transformations to joint spaces and slice spaces to render the perspective to match the captured image(s).

Figure 9:
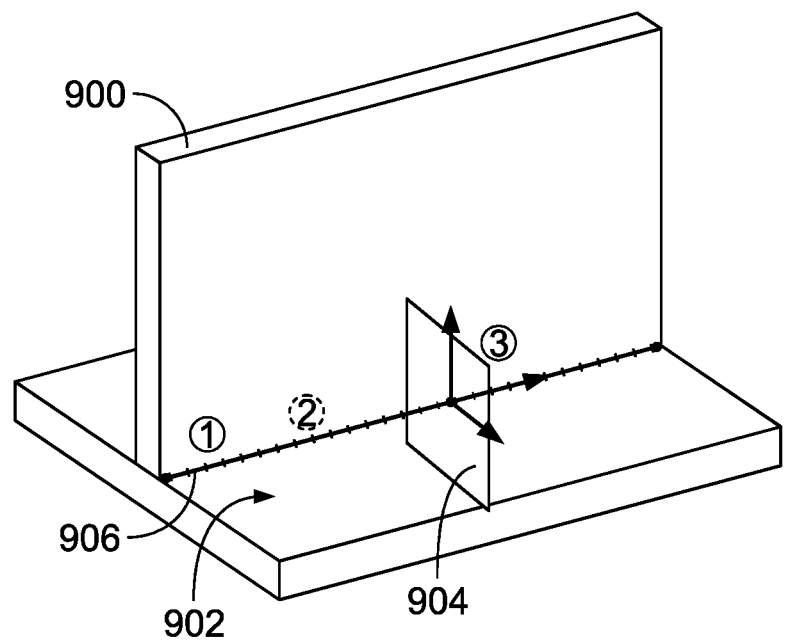
FIG. 9 illustrates an example reference frame that may be generated by the reference frame generator of FIG. 2 for an example tee joint-type workpiece.

FIG. 9 illustrates an example weld joint 902 and an example slice 904 that may be defined by the reference frame generator 204 of FIG. 2 for an example tee joint-type workpiece 900. The example weld joint 902 has a weld trajectory 906 that is defined as a straight line (e.g., along a seam between two pieces of the workpiece 900). To generate slices, the weld joint 902 is sampled at regular or irregular intervals. At each sample interval, the reference frame generator 204 defines a slice (e.g., the slice 904) having a slice plane. The sampling interval can be configured depending on desired precision. An example sampling interval is 50 samples per inch. The reference frame generator 204 may provide the slice definitions (e.g., as a function or transformation of the weld joint space and/or as a function or transformation of the workpiece space) to the slice manager 212 of FIG. 2. For each slice, the reference frame generator 204 defines a plane to be perpendicular to the joint trajectory and represents the cross-section of the workpiece and any weld beads at that point along the weld trajectory.

Figure 10A:
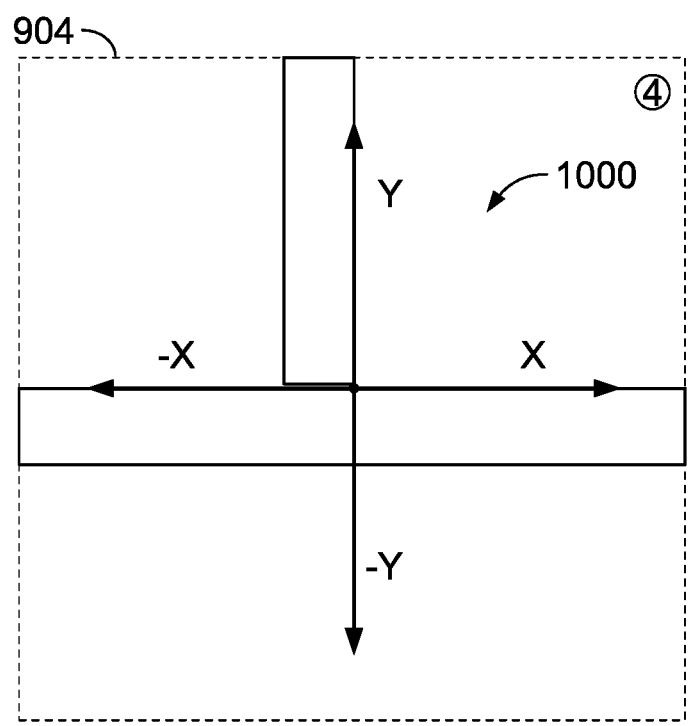
FIGS. 10A-10D illustrates an example data structures that may be used by the slice manager of FIG. 2 to represent slices.

Each slice has a two-dimensional coordinate system and a reference frame. The position and orientation of a given slice within the three-dimensional reference frame of the weld joint may be expressed as a transformation matrix (e.g., a 4×4 transformation matrix). FIG. 10A illustrates an example coordinate system 1000 that may be used by the slice manager 212 of FIG. 2 for the example slice 904 in the workpiece of FIG. 9. As described in more detail below, the result of a welding simulation (e.g., as determined by the weld solver 208 of FIG. 2) is represented within the slice 904 using control points and polygons. The example control points and polygons are defined and/or stored with reference to the coordinate system 1000, from which the data can be transformed to the joint space and/or workpiece space for rendering of the resulting weld bead. The coordination system 1000 for a slice is referred to herein as "slice space." The reference frame generator 204 defines a projection that maps two-dimensional slice space to the three-dimensional joint space and/or defines an inverse projection.

The slice manager 212 stores a representation of the cross-section data of each slice using polygons with linear interpolation of segments. In some examples, the polygons are defined through sequences of points in two-dimensions, and may be defined to always be closed. The slice manager 212 stores polygons with has associated data. Example polygon data includes: whether the polygon represents the coupon, weld bead, or auxiliary data; a pass number (e.g., bead number) of the polygon; a probability of simulated welding defects such as porosity or cracks in the polygon; applied heat input; and/or additional data stored per polygon segment, such as a sequence of slices that represent the volume of the simulated workpiece and all weld beads inside the weld joint area.

The example slice manager 212 stores slice data using vector data for storage efficiency. In some examples, the slice manager 212 compresses the slice data (e.g., the vector data) for further storage efficiency. The efficiency of storage enables the slice manager 212 to transmit slice data over a network to one or more remote devices (e.g., via the network 114 of FIG. 1, via the Internet, etc.) in substantially real time. For example, instructor software may receive the data from the simulator 102 and render the weld bead locally based on the received slice data. Additionally or alternatively, a mobile device located proximate the simulated workpiece may be used to provide the welder's view or a separate view based on the perspective of the mobile device, by receiving the slice data in real time from the simulator 102. The analysis components that generate the volumetric data representing the slice are separable from the graphical rendering components and, therefore, can be considerably smaller in size than conventional simulation systems. In some examples, the slice manager 212 creates volumes using sequences of multiple slices, in which each of the slices in the sequence stores a cross-section at a respective point along the weld bead.

Disclosed example simulation methods and systems using the slice data structure has multiple benefits compared with conventional weld simulation techniques. For example, the slice data structure improves the scalability of simulation, allowing the simulation to be performed at different resolutions depending on available system resources and capabilities. In some examples, the calculation of polygons can be implemented entirely on a CPU, without use of the GPU. The GPU can then be used to perform rendering, shading, and/or other graphical techniques based on available GPU resources. Disclosed example simulation methods and systems using the slice data structure also improve simulation efficiency, which enables the real-time transmission of data over a network to other devices (e.g., the remote device(s)

114 of FIG. 1). The slice data structure can then be rendered from the same or even a different point of view than the welder (e.g., from an observer's point of view), because the slice data is provided without rendering, which substantially reduces the data processing and/or transmission loads on the simulator 102.

Disclosed example simulation methods and systems using the slice data structure may result in improved mobility of simulation systems. For example, disclosed simulation methods are suitable for implementation on mobile devices and/or any other suitable computing device (e.g., using a processor of the computing device and instructions stored in the memory of the computing device). Such simulation methods and/or systems can generate the simplified form of the weld bead, which enables using an analysis module player without the need of downloading the data from an external service.

Disclosed example simulation methods and systems using the slice data structure enable multiple weld joints on a single coupon and simulation of weld joints with complex geometry. The slice data structure separates the shape of simulated weld bead into a cross-section and a lateral profile. Each of the cross-section and lateral profile can be calculated separately and/or combined at later stage to produce a final weld bead volume. The slice data structure enables both front and back facing sides of the weld union to be stored, enabling inspection, simulation, and welding of a union from multiple sides. For example, some welding processes that require welding a root pass from both sides can be performed using disclosed simulation methods and systems.

Disclosed example simulation methods and systems using the slice data structure improve flexibility of the simulation system, including enabling the use of more complex (e.g., custom and/or non-standard) workpieces. Such custom workpieces may have multiple weld joints with a variety of weld procedures, and may be particularly useful for training welders to weld parts that will be actually welded on a shop floor or other manufacturing setting. Modifications of base coupon geometry, as well as of all underlying weld beads, can be stored and visualized. The flexibility in workpiece design is also useful for simulating GTAW welding processes, in which the weld puddle might be formed from the melted metal of the workpiece (e.g., instead of the filler). The flexibility is also useful for simulating thin workpieces and/or simulating welding of certain materials such as aluminum, where there is a real risk of deformation of the workpiece. Disclosed example systems and methods can simulate, store, and/or visualize perforations of the base workpiece and/or of any or all underlying weld beads, which is useful for simulating thin workpieces for which perforation of the workpiece is a substantial risk.

For each welding pass, disclosed example systems and methods store the volume of the simulated weld bead. Weld bead data is stored as polygons and is therefore already efficiently stored. Also, additional data can be stored for any point along the weld bead. Such additional data might include a probability of simulated welding defects (e.g., porosity) and/or a probability of simulated applied heat input. Disclosed examples also provide the ability to undo all or part of the weld bead (e.g., removing the simulated weld bead in reverse order from which the weld bead was created) by storing changes to slices between samples and/or between passes. The ability to undo enables a review of earlier passes by the welder after a later pass has been performed.

Disclosed example systems and methods enable visibility and examination of weld cross-sections and/or undercut. Because the slices extend through a cross-section of the workpiece as well as through the weld beads and/or passes, disclosed example systems and methods can show a cross-section for any slice (e.g., any sample point) along the weld bead. Example systems and methods can also show cross-section of the forming weld bead in substantially real time, while the student is welding.

Figure 10B:
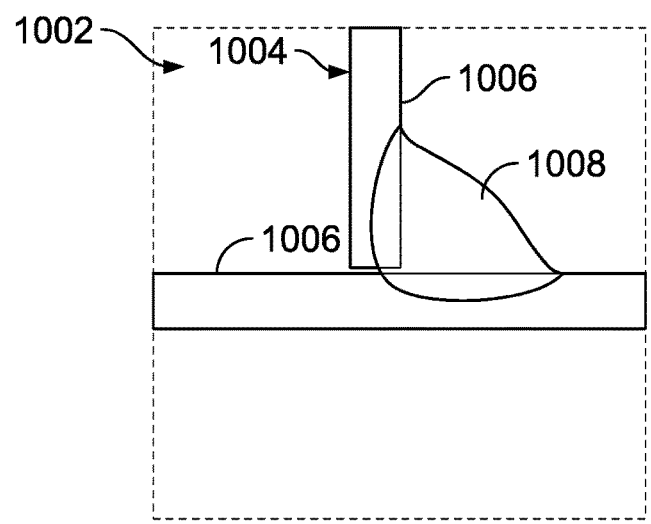

FIG. 10B illustrates a data structure of an example slice 1002 of a T-joint workpiece 1004. The slice 1002 is a visual representation of a data structure including first polygons 1006 representing the workpiece 1004, and second polygons 1008 representing the weld bead. The first polygons 1006 include data indicating that the first polygons 1006 are representative of the workpiece 1004, and the second polygons 1008 include data indicating that the second polygons 1008 are representative of the weld bead. The first and second polygons 1006, 1008 are defined using control points and/or equations, with reference to a coordinate system (e.g., the coordinate system 1000 of FIG. 10A).

Figure 10C:
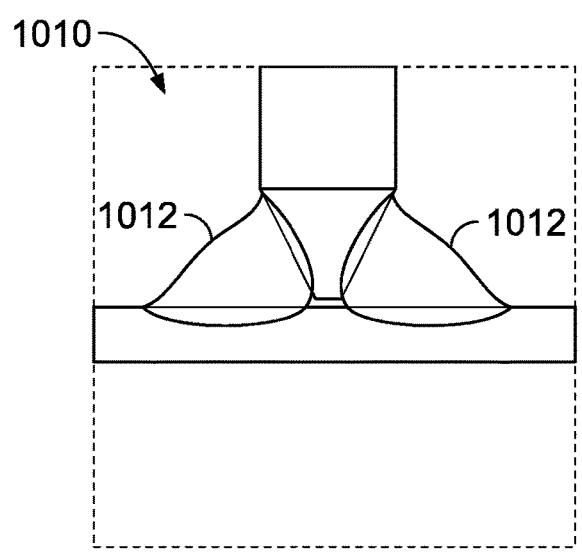

FIG. 10C illustrates a data structure of another example slice 1010 of the T-joint workpiece, including polygons 1012, 1014 associated with different weld beads (and polygons associated with the workpiece). As in FIG. 10B, the polygons 1012, 1014 are defined using control points and/or equations, with reference to a coordinate system (e.g., the coordinate system 1000 of FIG. 10A). However, the example polygons 1012, 1014 belong to different weld beads, such that the polygons 1012, 1014 may have different transformations with respect to the separate weld bead reference frames.

Figure 10D:
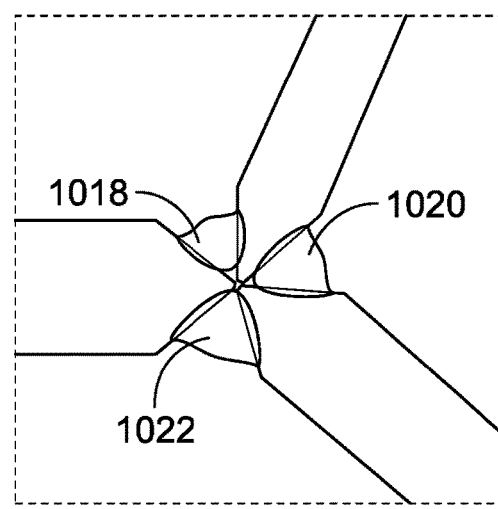

FIG. 10D illustrates a data structure of yet another example slice 1016 of a Y-shaped workpiece, including polygons 1018, 1020, 1022 (and polygons associated with the workpiece). As in FIGS. 10B and 10C, the polygons 1018, 1020, 1022 are defined using control points and/or equations, with reference to a coordinate system (e.g., the coordinate system 1000 of FIG. 10A). However, the example polygons 1018, 1020, 1022 each belong to a different weld bead, such that the polygons 1018, 1020, 1022 may have different transformations with respect to the separate weld bead reference frames.

Returning to FIG. 2, when the workpiece space, weld joints, weld joint space, slices, and/or slice reference frames have been generated for a weld training simulation, the example simulator 102 may simulate a welding operation. In some examples, simulation of welding occurs in response to an initiation of the simulation by the welder. For example, the welder may press a "start simulation" button on the simulator interface 108, depress a trigger on the simulated torch 118, and/or otherwise initiate the simulation.

Figure 11:
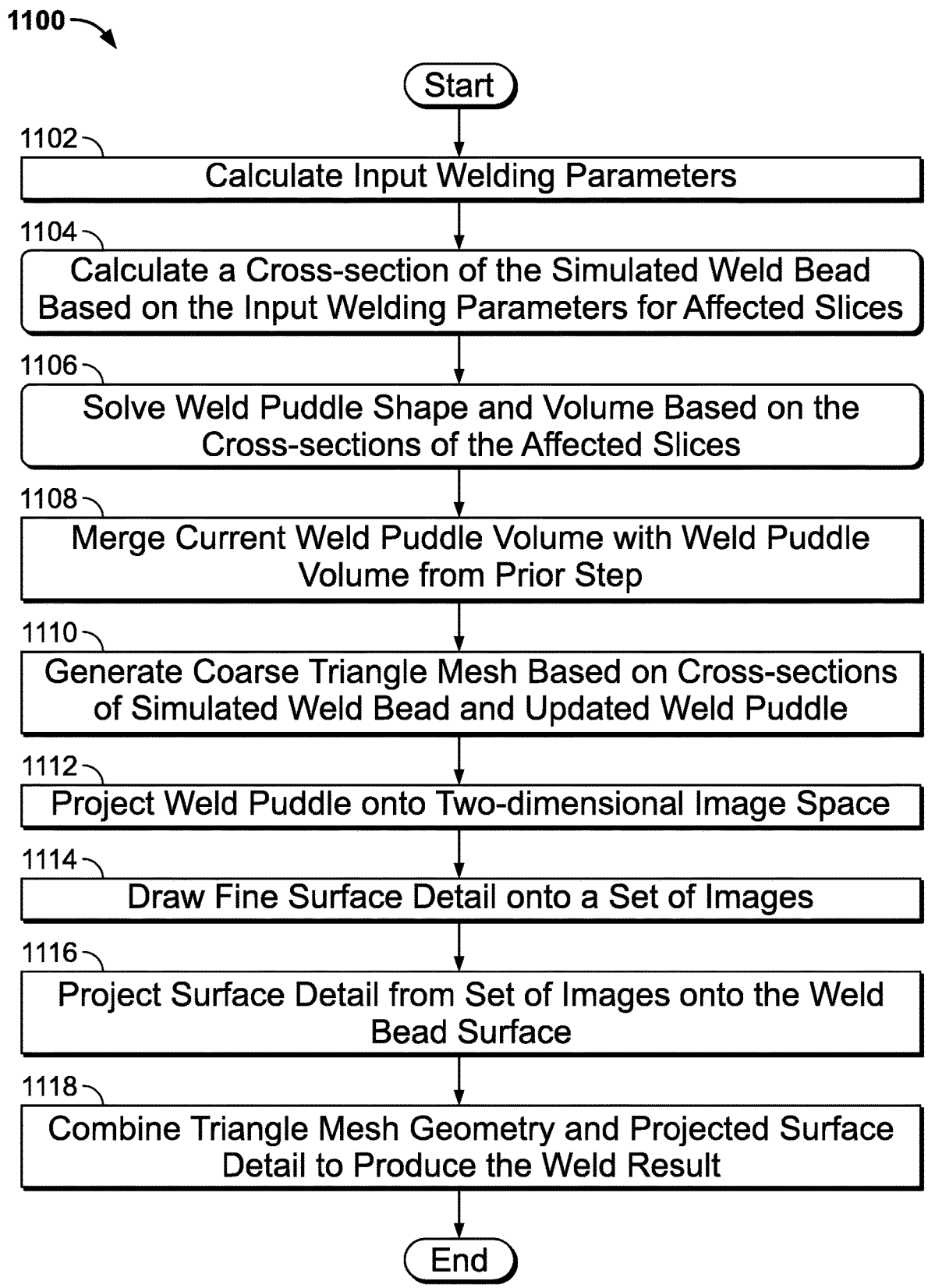
FIG. 11 is a flowchart representative of example machine readable instructions which may be executed by the example simulator of FIG. 2 to simulate a result of a training weld.

FIG. 11 is a flowchart representative of example machine readable instructions 1100 which may be executed by the example simulator 102 of FIG. 2 to simulate a result of a training weld. The simulator 102 and/or the instructions 1100 may be implemented by the computing system 3000 of FIG. 30. The example instructions 1100 of FIG. 11 may be executed as iterative steps to provide a sensation to the user of a continuous simulation. Each simulation step (or frame) updates the simulated weld bead and workpiece data (e.g., slice data) for a particular time differential. An example frame rate or step rate may be approximately 60 frames per second.

At block 1102, the example weld parameter detector 206 calculates input welding parameters. For example, the weld parameter detector 206 determines weld parameters based on images captured by the image sensor(s) 104 and/or recognized markers in the images. For example, using the marker information, the weld parameter detector 206 detects travel speed (e.g., changes in location of the torch relative to the workpiece, based on marker recognition), work angle, travel angle, arc length, and/or contact tip to work distance. The weld parameter detector 206 provides the detected weld parameters to the weld solver 208 at a designated sampling rate.

In addition to the visually-detected weld parameters, programmed weld parameters affect the simulation result. Example programmed weld parameters include power source values such as weld process type (e.g., SMAW, GMAW, FCAW, GTAW, etc.), weld voltage, weld current, wire feed speed, electrode type, electrode composition, weld gas type, and/or weld gas flow rate. The weld solver 208 may determine and/or receive the programmed weld parameters.

At block 1104, the weld solver 208 calculates a cross-section of the simulated weld bead based on the input welding parameters for affected slices. For example, the weld solver 208 iteratively calculates the cross-section of the simulated weld bead (e.g., for each slice affected by the simulated arc at a given time) and calculates characteristics of the weld puddle, based on the input parameters. An example implementation of block 1104 is described below with reference to FIG. 12.

At block 1106, the weld solver 208 solves a weld puddle shape and volume based on the cross-sections of affected slices. For example, the weld solver 208 may use the cross-sections of the slices and/or an expected shape of a weld puddle to simulate a resulting shape of the weld puddle. An example implementation of block 1106 is described below with reference to FIG. 13.

To calculate the cross-sections and the weld puddle, the example weld solver 208 accesses the simulation database 210 using the input parameters and data from one or more prior iterations. For example, prior iterations may determine a shape of the workpiece and filler, to which new filler may be added during a subsequent iteration.

The example simulation database 210 of FIG. 2 includes a lookup table that maps combinations of input parameters and polygon data to weld puddle shapes and/or weld results. The example simulation database 210 may be populated based on empirical test data, computer modeling, and/or any other method of determining relationships between available input parameters, polygon data, weld puddle shapes, and/or weld results. The weld solver 208 queries the simulation database 210 at each iteration or sample, using detected input parameters including detected weld parameters and/or programmed weld parameters.

In addition to querying the simulation database 210, the example weld solver 208 applies rules to evaluate and determine the weld result at a given point during the welding simulation. The slice data (e.g., weld cross-section) is represented in simplified terms, using control points and relations between the control points.

Figure 12:
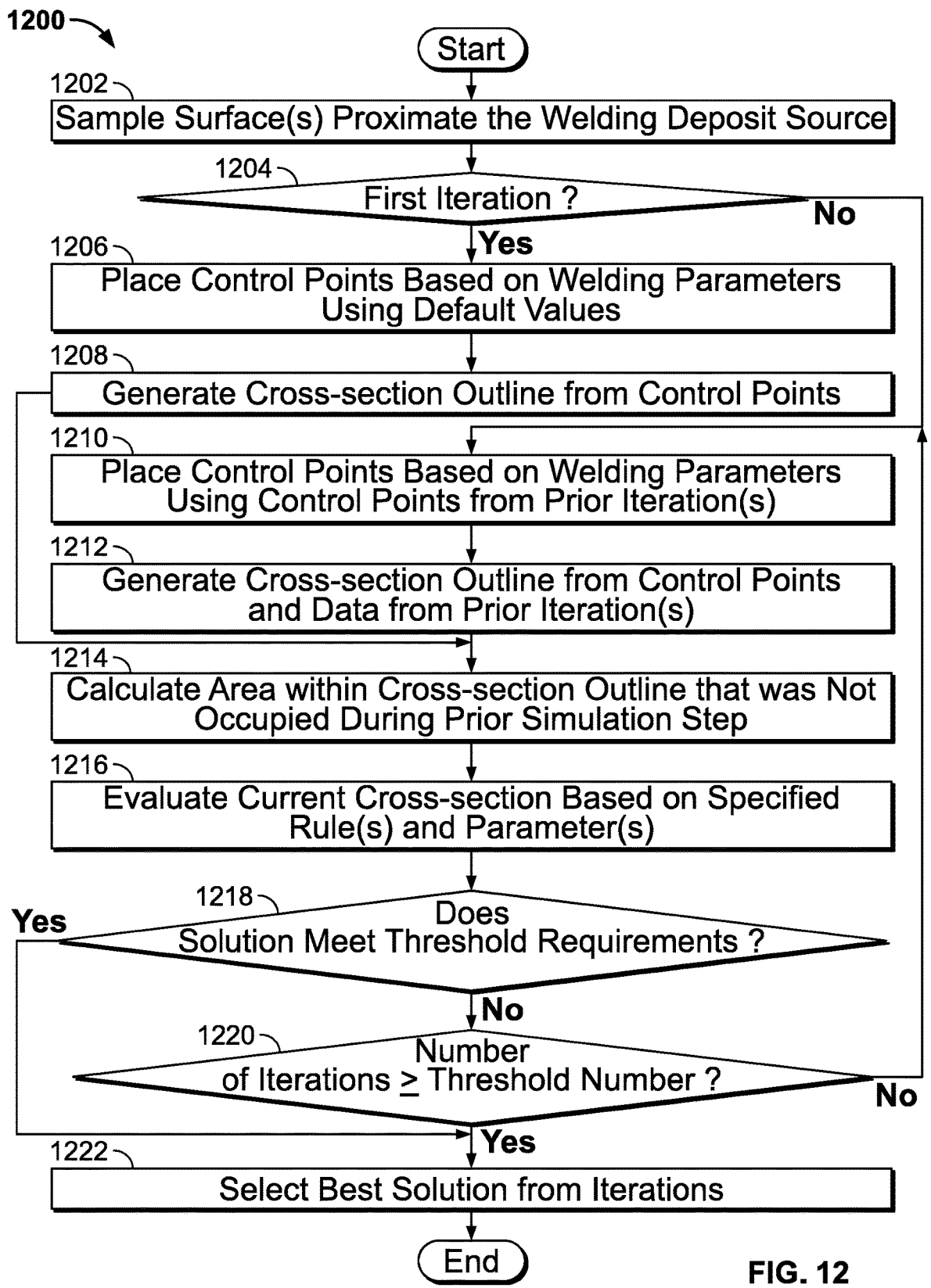
FIG. 12 is a flowchart representative of example machine readable instructions which may be executed by the example weld solver of FIG. 2 to calculate a cross-section of a simulated weld bead.

FIG. 12 is a flowchart representative of example machine readable instructions 1200 which may be executed by the example weld solver 208 of FIG. 2 to calculate a cross-section of a simulated weld bead. The weld solver 208 and/or the instructions 1200 may be implemented by the computing system 3000 of FIG. 30.

Figure 15A:
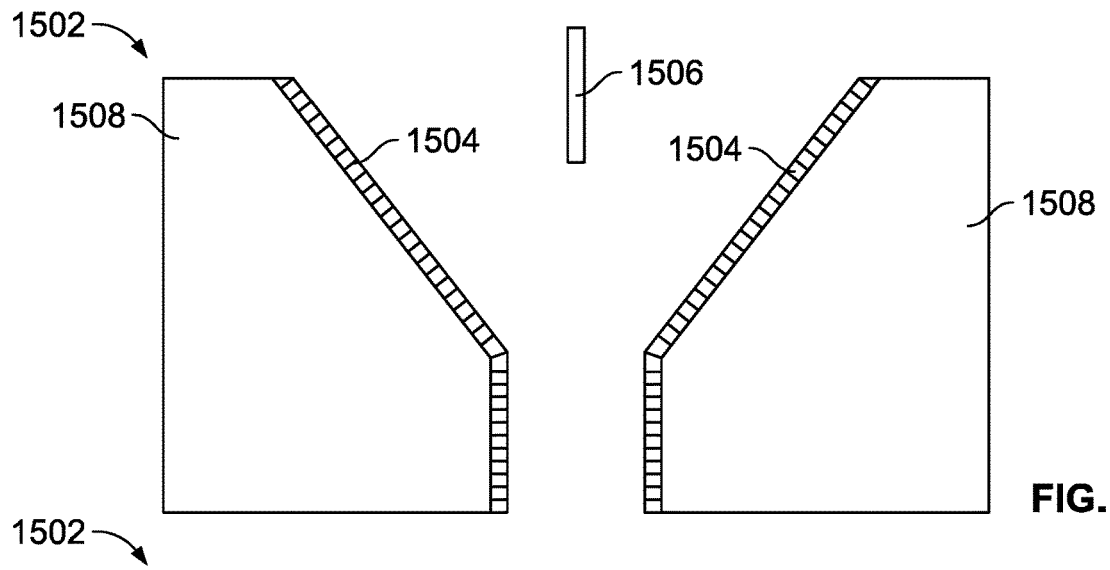
FIGS. 15A to 15C illustrate an example calculation of a cross-section of a simulated weld bead.
Figure 15B:
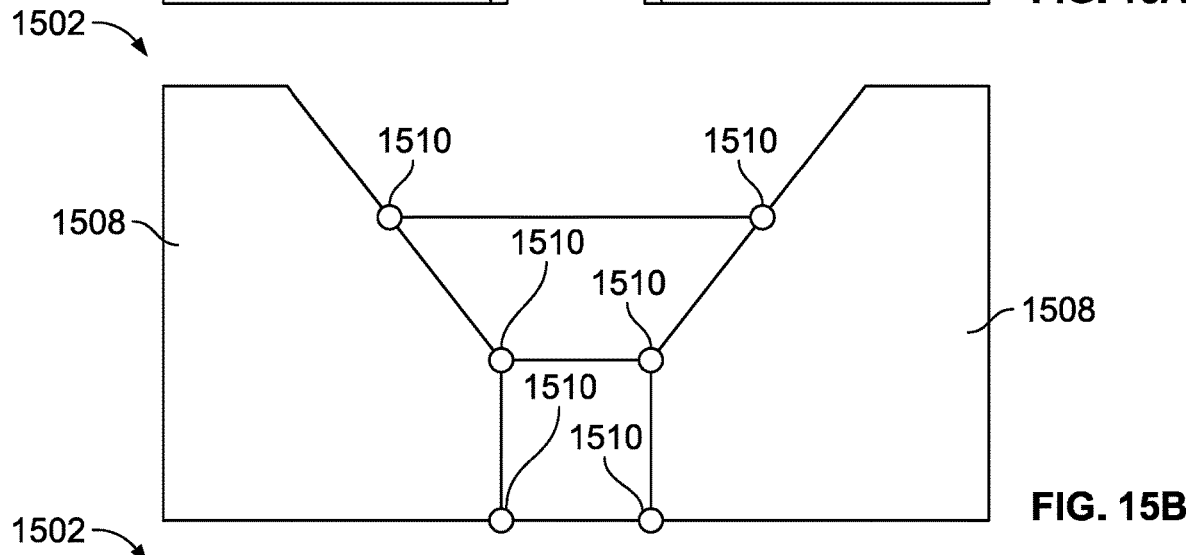
Figure 15C:
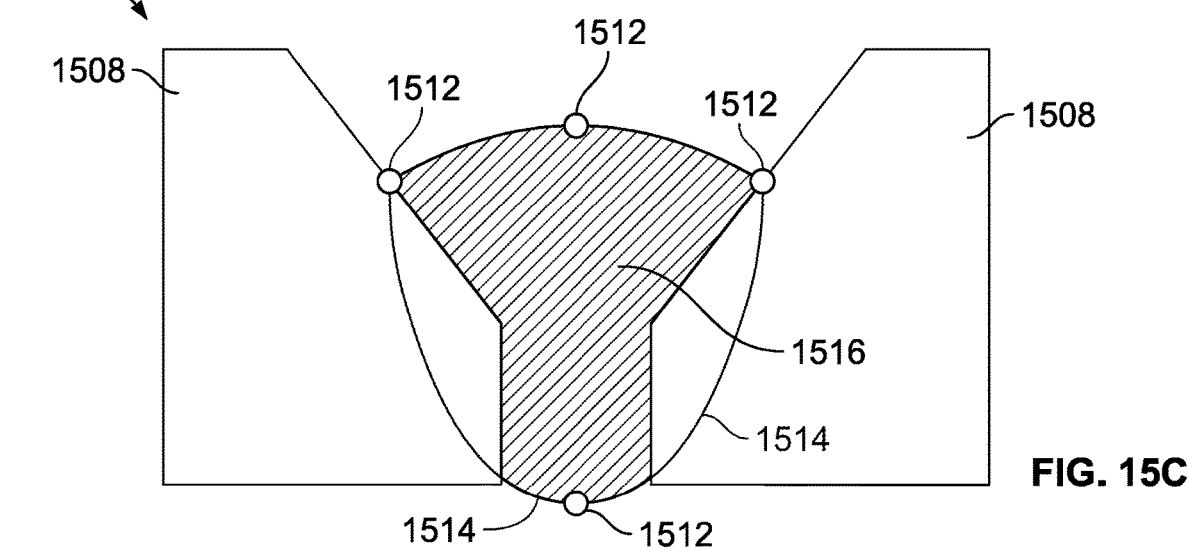

The example instructions 1200 may be executed to implement block 1104 of FIG. 11 to calculate a cross-section of the simulated weld bead based on the input welding parameters for affected slices. The example instructions 1200 are described below with reference to a single slice of a set of affected slices during a single step of the simulated weld, but instances of the instructions 1200 are executed (e.g., serially and/or in parallel) for each of the affected slices in the step. FIGS. 15A-15C illustrate an example of calculating a polygon for a cross-section (e.g., a slice 1502) during a simulation. The example process illustrated in FIGS. 15A-15C may be performed for multiple slices at each step of the simulation. FIGS. 15A-15C are discussed below with reference to the instructions 1200 of FIG. 12.

At block 1202 of FIG. 12, the weld solver 208 samples surface(s) proximate the welding deposit source. FIG. 15A illustrates sampling of a surface 1504 around a welding deposit source 1506 (e.g., an electrode). As illustrated in FIG. 15A, the weld solver 208 samples the surface at multiple intervals, which includes sampling a workpiece 1508 and any weld bead surface that may be present (from prior steps).

After sampling, the example weld solver 208 determines a set of control points for each affected slice. At block 1204, the weld solver 208 determines whether the current iteration is the first iteration (e.g., for the current simulation step). If the current iteration is the first iteration (block 1204), at block 1206 the weld solver 208 places control points for the slice based on the welding parameters using default values. The default values may be determined using one or more rules. At block 1208, the weld solver 208 generates a cross-section outline from the control points.

If the current iteration is not the first iteration (block 1204), at block 1210 the weld solver 208 places control points for the slice based on the welding parameters using control points from one or more prior iteration(s). At block 1212, the weld solver 208 generates a cross-section outline from the control points and data from the prior iteration(s).

FIG. 15B illustrates a placement of control points 1510. FIG. 15B illustrates a first iteration (e.g., blocks 1206, 1208), in which the weld solver 208 places control points 1510 based on default values. For subsequent iterations, the control points are placed based on data from one or more prior iterations (see FIG. 15C for control points 1512 set during a subsequent iteration (e.g., blocks 1210, 1212). The control points function as an intermediate shape of the weld bead cross-section within the slice.

The weld solver 208 generates a cross-section polygon based on the control points. FIG. 15C illustrates a generation of the cross-section outline 1514 from control points and data from zero or more prior iterations. The weld solver 208 may add and/or remove control points 1510, 1512 and relationships between control points as needed to represent the cross-section (e.g., as limited by the cross-section area determined above). The weld solver 208 may process the intermediate shape at a higher resolution than the stored data to improve the quality of the resulting weld bead shape.

After generating the cross-section outline (block 1208 or block 1212), at block 1214 the weld solver 208 calculates an area within the cross-section outline that was not occupied during the prior simulation step. The area that was not previously occupied represents added volume (e.g., due to added filler metal). For example, the weld solver 208 calculates a volume of material deposited from the filler using a filler deposit rate (e.g., a programmed deposit rate such as wire feed speed, an observed value based on changes in arc length and/or CTWD using visual information, and/or a combination of programmed deposit rate and visually observed data) and travel speed of the simulated torch 118 (e.g., visually observed data). The weld solver 208 determines a corresponding area in affected slices based on the calculated volume of material. The weld solver 208 uses the calculated area as the primary parameter controlling the resulting shape of the cross-section (e.g., the weld bead polygon shapes). As illustrated in FIG. 15C, the weld solver 208 may calculate a total area 1516 within the slice 1502 that was not occupied by any material (e.g., workpiece material or filler material) during a previous step. The total area 1516 is bound by the outline 1514.

At block 1216, the weld solver 208 evaluates the current cross-section based on one or more specified rule(s) and parameter(s). The weld solver 208 evaluates the current slice 1502 based on rules and/or parameters, which may be applied based on the welding process and/or filler material used for the simulated weld. The rules establish restrictions on the cross-section (e.g., polygon) shape. Example rules include: requiring that the volume of resulting weld bead must match (e.g., within a margin of error) a volume of material deposited from the filler within the slice and/or across affected slices for the iteration; the extremities of the polygon must be connected to material that was present in a previous iteration (e.g., the bead cannot float in the air, disconnected from the workpiece); the polygon must form a continuous, non-overlapping curve; the polygon must be aligned with the welding source (e.g., an electrode, a welding gun, etc.); and/or the base estimation for the cross-section shape is derived from the underlying surface. Additional or alternative rules may be added.

At block 1218, the weld solver 208 determines whether the solution for the current cross-section meets threshold requirements. If the solution for the current cross-section does not meet threshold requirements (block 1218), at block 1220 the weld solver 208 determines whether a number of performed iterations for the cross-section during the current step is at least a threshold number of iterations. If the number of performed iterations for the cross-section during the current step is less than the threshold number of iterations (block 1220), control returns to block 1210 to place control points for another iteration.

For example, after evaluating a slice based on the rules, the weld solver 208 may start a new iteration at the placement of control points (e.g., FIG. 15B). Each iteration is based on data from the previous iteration. The weld solver 208 iteratively refines the placement of control points based on the rules, parameters specific to each welding process, filler type and/or diameter, and on real-time input parameters. Example parameters specific to welding process and filler type/diameter include: weld bead width and/or height; weld bead convexity and/or concavity; reinforcement and penetration depth; and/or reinforced area, penetrated area, and/or dilution factor.

Figure 16A:
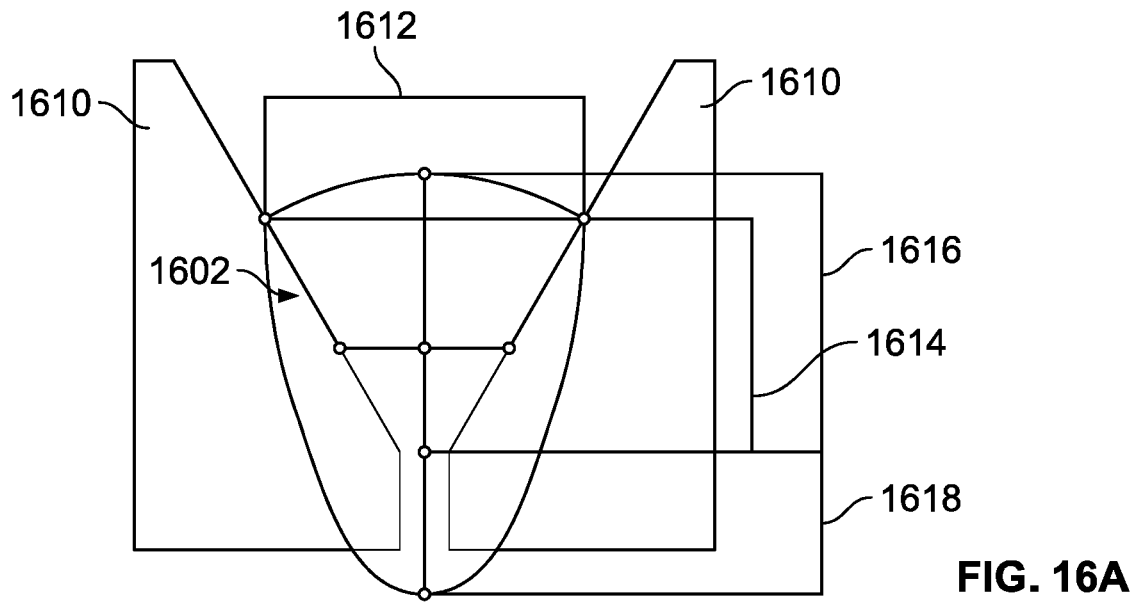
FIGS. 16A to 16C illustrate example characterizations of weld beads based on calculated control points for a simulated weld bead within a slice.
Figure 16B:
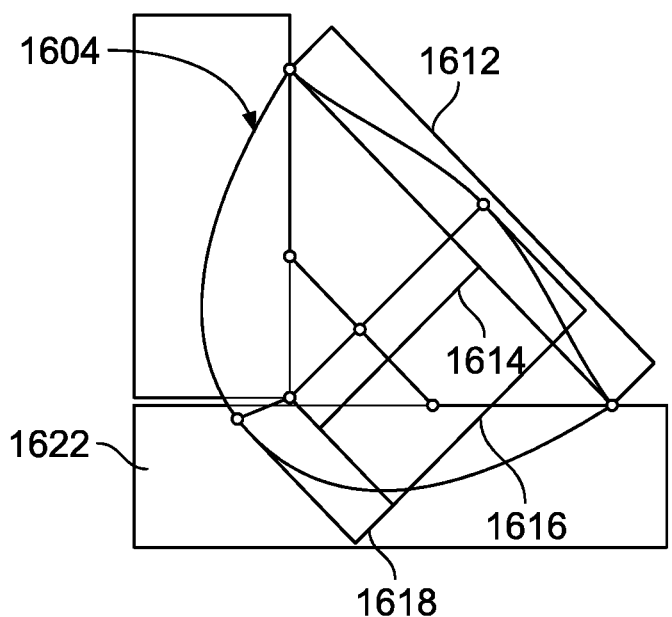
Figure 16C:
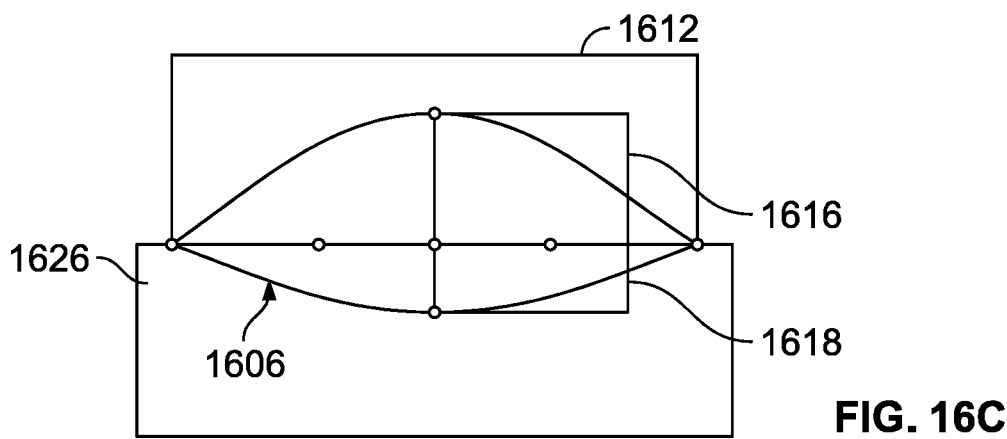

FIGS. 16A to 16C illustrate example characterizations of weld beads 1602, 1604, 1606 based on calculated control points 1608 for a simulated weld bead within a slice. The characterizations represented in FIGS. 16A-16C may be used by the weld solver 208 to evaluate an iteration of control point placement within a slice.

FIG. 16A illustrates a characterization of a root pass weld bead 1602 for a butt joint 1610. The characterization of the weld bead 1602 includes calculations of a bead width 1612, a throat depth 1614, a reinforcement depth 1616, and a penetration depth 1618. FIG. 16B illustrates similar characterizations 1612-1618 for a corner bead 1604 (e.g., a T-joint 1622). FIG. 16C illustrates similar characterizations 1612-1616 for a flat bead 1606 (e.g., a plate 1626), with a throat depth of 0. Each of the characterizations 1612-1618 may be defined by particular control points and/or polygons, which have different interpretations for the different types of joints 1610, 1622, 1626.

Figure 17A:
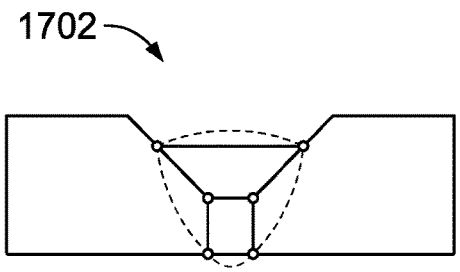
FIGS. 17A to 17F illustrate example weld beads for slices of multiple example workpiece and/or joint types based on calculated control points.
Figure 17B:
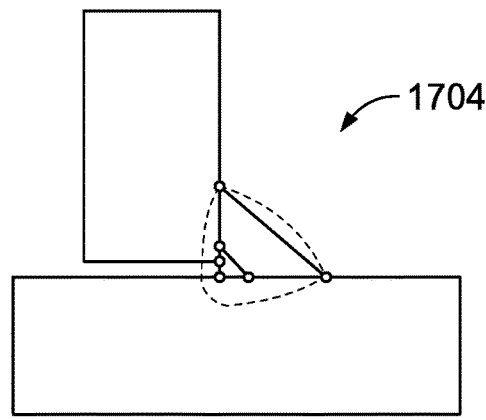
Figure 17C:
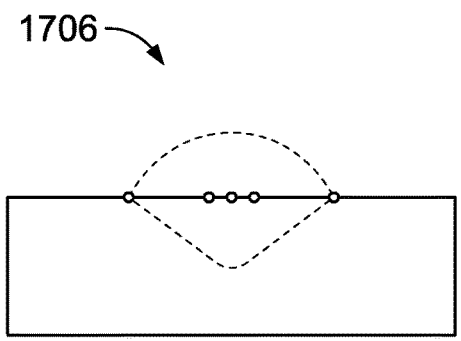
Figure 17D:
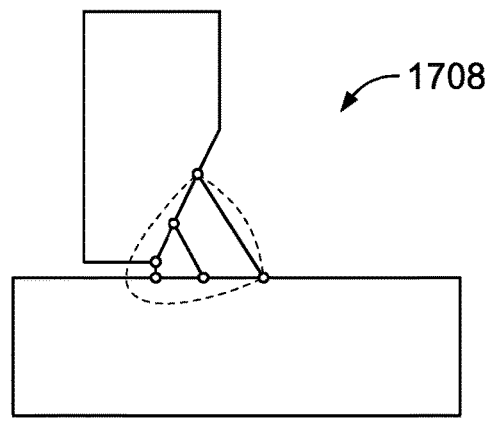
Figure 17E:
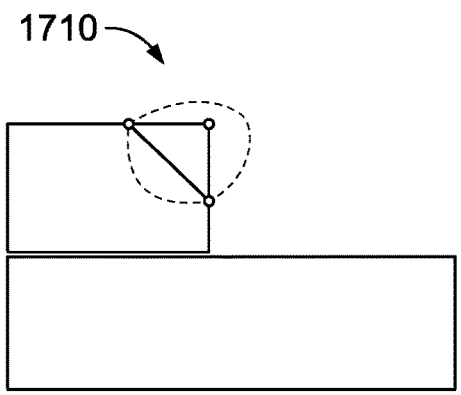
Figure 17F:
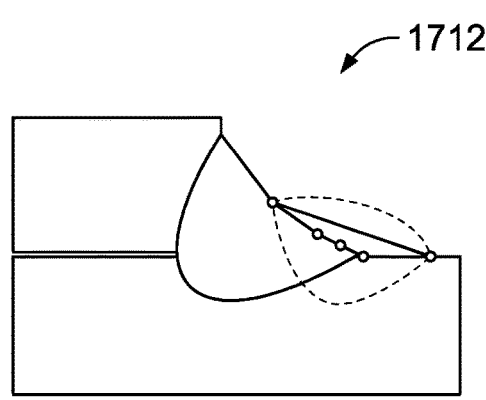

FIGS. 17A to 17F illustrate example weld beads for slices of multiple example workpiece and/or joint types based on calculated control points and vectors. FIG. 17A illustrates a slice 1702 with a calculated butt joint root bead. FIG. 17B illustrates a slice 1704 with a calculated T-joint root bead. FIG. 17C illustrates a slice 1706 with a calculated plate flat bead. FIG. 17D illustrates a slice 1708 with a T-joint bevel bead. FIG. 17E illustrates a slice 1710 with a lap joint edge bead. FIG. 17F illustrates a lap joint 1712 second pass bead over a first pass.

If the solution for the current cross-section meets the threshold requirements (block 1218), or if the number of performed iterations for the cross-section during the current step meets the threshold number of iterations (block 1220), at block 1222 the weld solver 208 selects the best solution from the iterations. The example instructions 1200 may then iterate for another slice and/or end and return control to block 1106 of FIG. 11. The iterations may end when a threshold number of iterations are performed and/or when a solution has been identified that meets selected (or all) of the applied rules.

Figure 13:
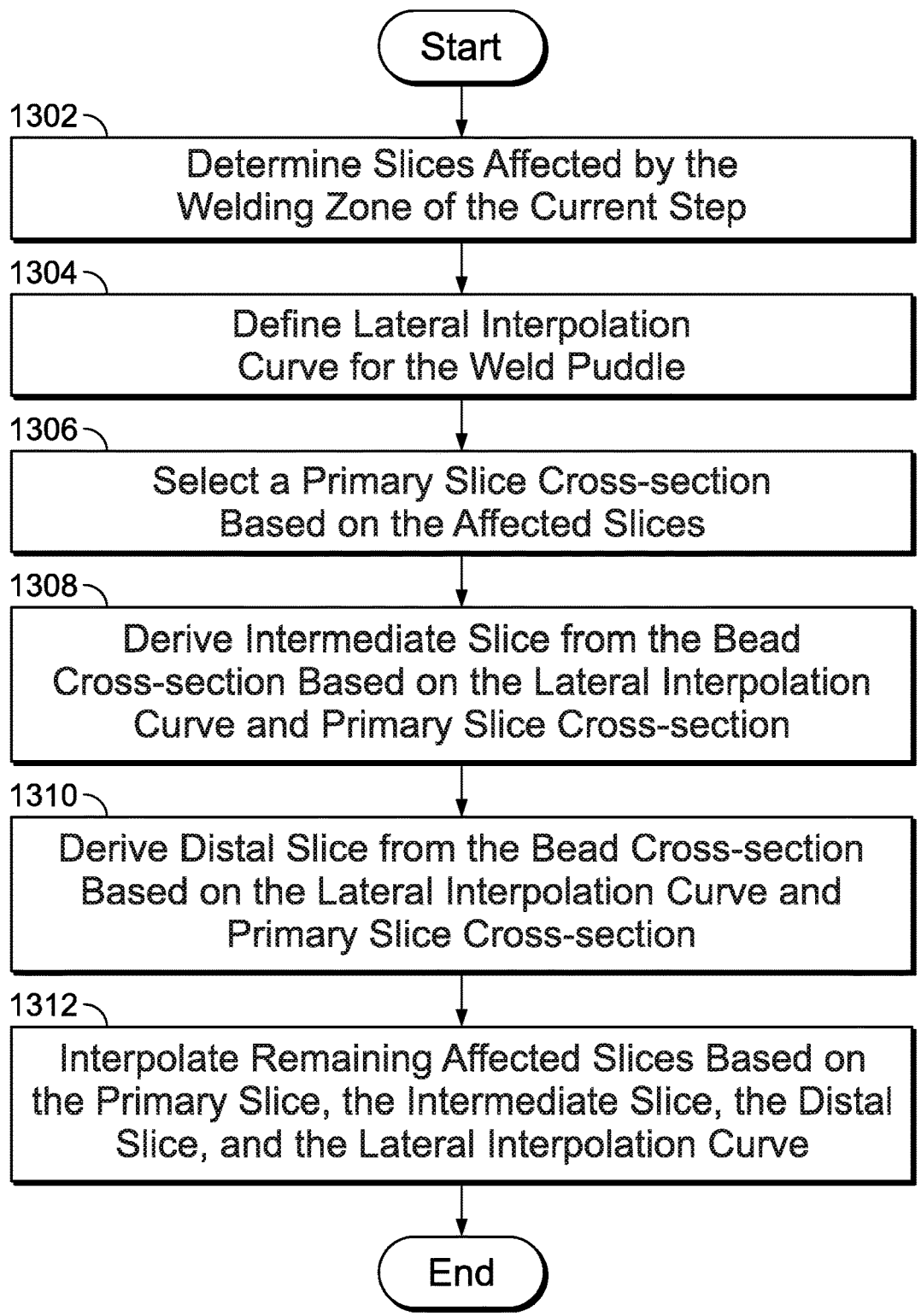
FIG. 13 is a flowchart representative of example machine readable instructions which may be executed by the example weld solver of FIG. 2 to solve a weld puddle shape and volume.

FIG. 13 is a flowchart representative of example machine readable instructions 1300 which may be executed by the example weld solver 208 of FIG. 2 to solve a weld puddle shape and volume. The weld solver 208 and/or the instructions 1300 may be implemented by the computing system 3000 of FIG. 30.

The example instructions 1300 may be executed to implement block 1106 of FIG. 11 to solve a weld puddle shape and volume. The example instructions 1300 do not directly calculate the entire volume of the weld puddle. Instead, the example instructions 1300, when executed, cause the weld solver 208 to calculate only the cross-section of the resulting simulated weld bead and then approximate the shape of the weld puddle.

Figure 18:
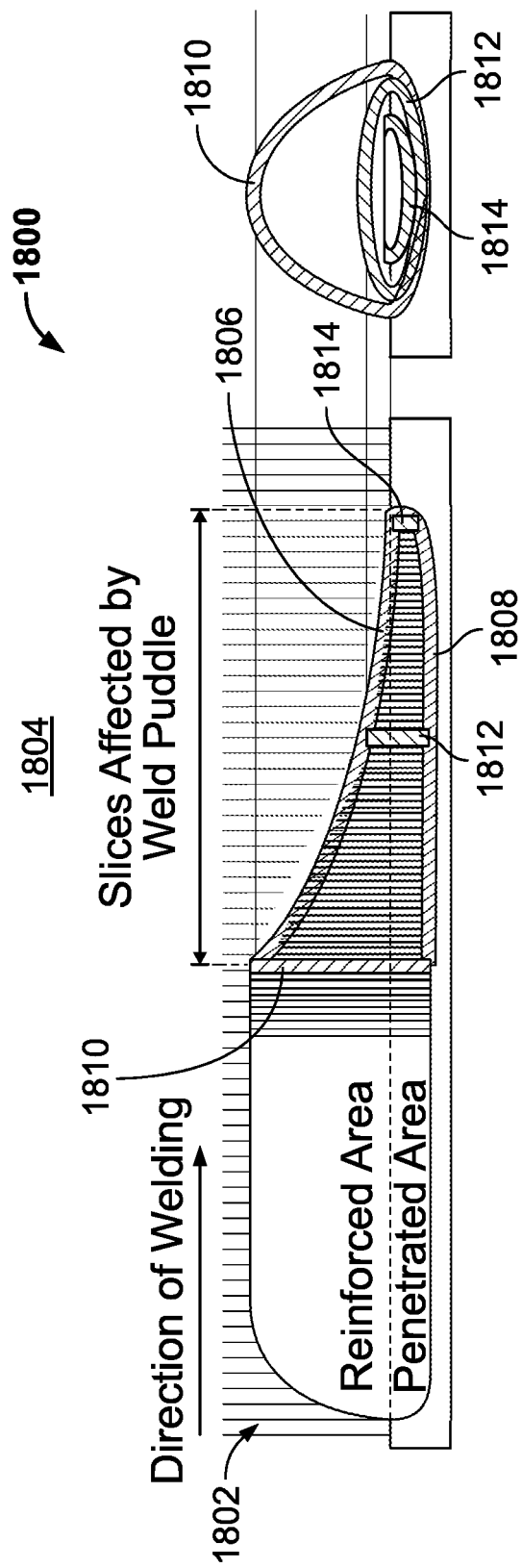
FIG. 18 illustrates an example calculation of a simulated weld bead and a simulated weld puddle across multiple slices.

The example instructions 1300 are described below with reference to a single slice of a set of affected slices during a single step of the simulated weld, but instances of the instructions 1300 are executed (e.g., serially and/or in parallel) for each of the affected slices in the step. FIG. 18 illustrates an example calculation of a simulated weld puddle 1800 across multiple slices of a simulated weld bead 1802. The instructions 1300 are described below with reference to the example weld puddle calculation of FIG. 18.

At block 1302, the weld solver 208 determines a set of slices 1804 affected by the welding zone of the current step. For example, the set of slices 1804 are determined based on measured weld parameters (e.g., the location of the simulated weld torch 118 relative to the simulated workpiece 116 as determined by the marker detector 202) and/or programmed weld parameters. The affected slices are illustrated in FIG. 18 as vertical lines separated by intervals.

At block 1304, the weld solver 208 defines a lateral interpolation curve for the weld puddle. The lateral interpolation curve determines the lateral shape of the weld puddle (e.g., across the affected slices 1804). An example lateral interpolation curve is illustrated in FIG. 18 as a surface curve 1806 over the affected slices 1804 and a penetration curve 1808 on a workpiece side of the slices. The weld solver 208 may select or calculate the lateral interpolation as a predetermined relationship based on measured and/or programmed weld parameters to provide a characteristic slope and curvature of a real-world weld puddle, which often takes a consistent shape.

At block 1306, the weld solver 208 determines a primary slice cross-section based on the affected slices. For example, the primary slice cross-section may be selected by simulating the slice cross-sections as described above with reference to FIG. 12. An example primary slice cross-section 1810 is illustrated in FIG. 18.

At block 1308, the weld solver 208 derives an intermediate slice from the bead cross-section based on the lateral interpolation curve and the primary slice cross-section. At block 1310, the weld solver 208 derives an distal slice from the bead cross-section based on the lateral interpolation curve and the primary slice cross-section. For example, the weld solver 208 fits the lateral interpolation curve 1806, 1808 to the primary slice cross-section to determine the locations and set the cross-section polygon data of the intermediate slice and the distal slice. An example intermediate slice 1812 and an example distal slice 1814 are illustrated in FIG. 18. However, the positions of the intermediate slice 1812 and/or the example distal slice 1814 may be selected to be different from the example slices 1812, 1814.

At block 1312, the weld solver 208 interpolates the remaining affected slices based on the primary slice, the intermediate slice, the distal slice, and the lateral interpolation curve. For example, the weld solver 208 may reconfigure the slice geometries and/or control points to fit the lateral interpolation curve as set based on the primary slice, the intermediate slice, and the distal slice.

After interpolating the weld puddle, the example instructions may end and return control to block 1108 of FIG. 11.

Returning to FIG. 11, at block 1108, the weld solver 208 merges a current weld puddle volume with a weld puddle volume from the prior step. For each affected slice of the weld puddle (block 1106), the weld solver 208 merges the cross-section polygon of the weld puddle with any previous weld puddle polygon. The merging of weld puddles improves the simulation accuracy of weaved welds.

Figure 14:
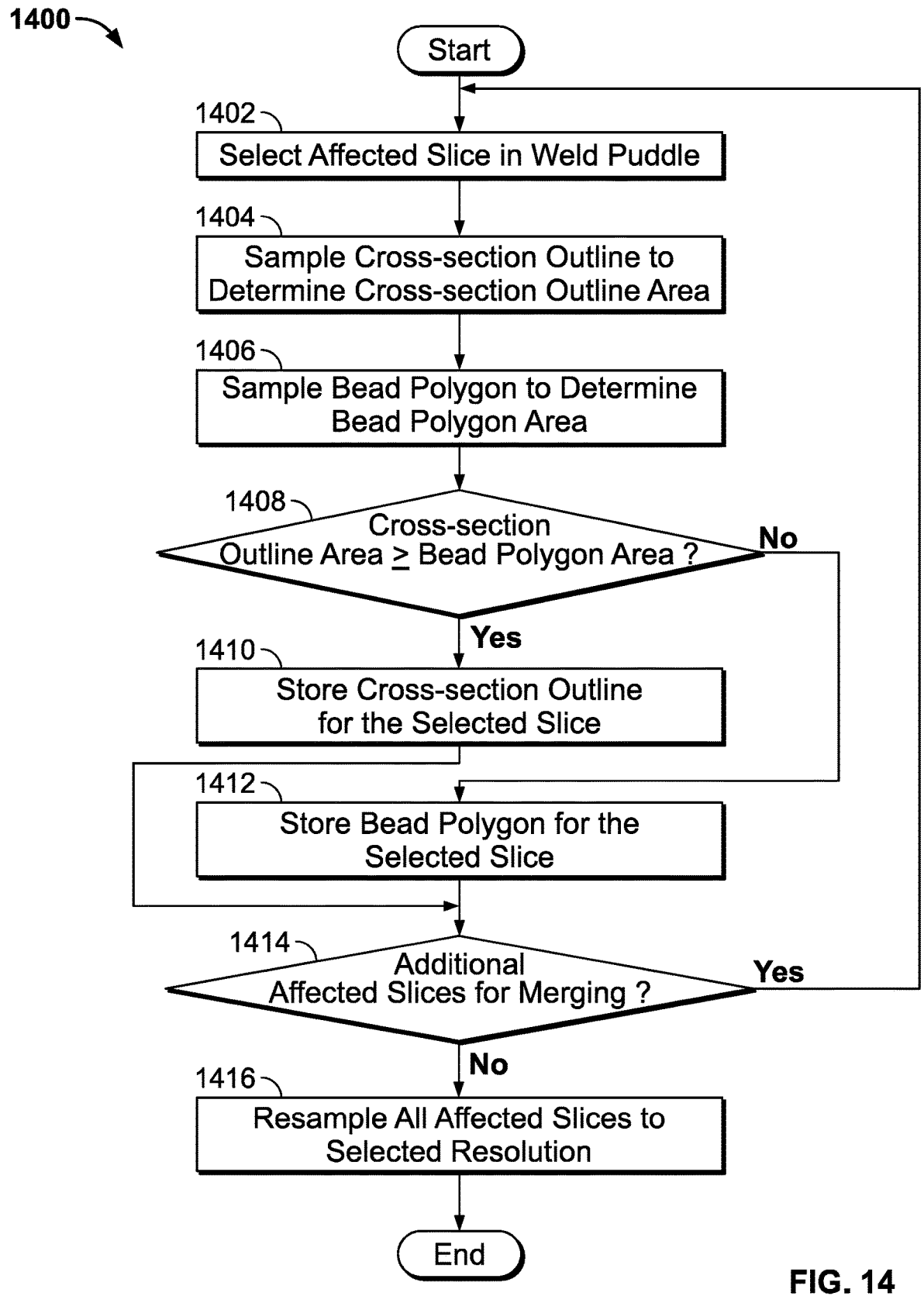
FIG. 14 is a flowchart representative of example machine readable instructions which may be executed by the example weld solver of FIG. 2 to merge a new weld puddle volume with a previous weld puddle volume.

FIG. 14 is a flowchart representative of example machine readable instructions 1400 which may be executed by the example weld solver 208 of FIG. 2 to merge a new weld puddle volume with a previous weld puddle volume. The weld solver 208 and/or the instructions 1400 may be implemented by the computing system 3000 of FIG. 30. The example instructions 1400 may be executed to implement block 1108 of FIG. 11 to merge a new weld puddle volume with a previous weld puddle volume.

At block 1402, the weld solver 208 selects an affected slice in the weld puddle. The affected slice may be one of the slices 1804 of FIG. 18. At block 1404, the weld solver 208 samples the cross-section outline to determine a cross-section outline area.

At block 1406, the weld solver 208 samples the bead polygon to determine a bead polygon area.

At block 1408, the weld solver 208 determines whether the cross-section outline area is greater than or equal to the bead polygon area. If the cross-section outline area is greater than or equal to the bead polygon area (block 1408), at block 1410 the slice manager 212 stores the cross-section outline for the selected slice. On the other hand, if the cross-section outline area is less than the bead polygon area (block 1408), at block 1410 the slice manager 212 stores the bead polygon for the selected slice.

After storing the cross-section outline (block 1410) or storing the bead polygon (block 1412), at block 1414 the weld solver 208 determines whether there are any additional affected slices for merging. If there are additional slices for merging (block 1414), control returns to block 1402 to select another affected slice.

Figure 19:
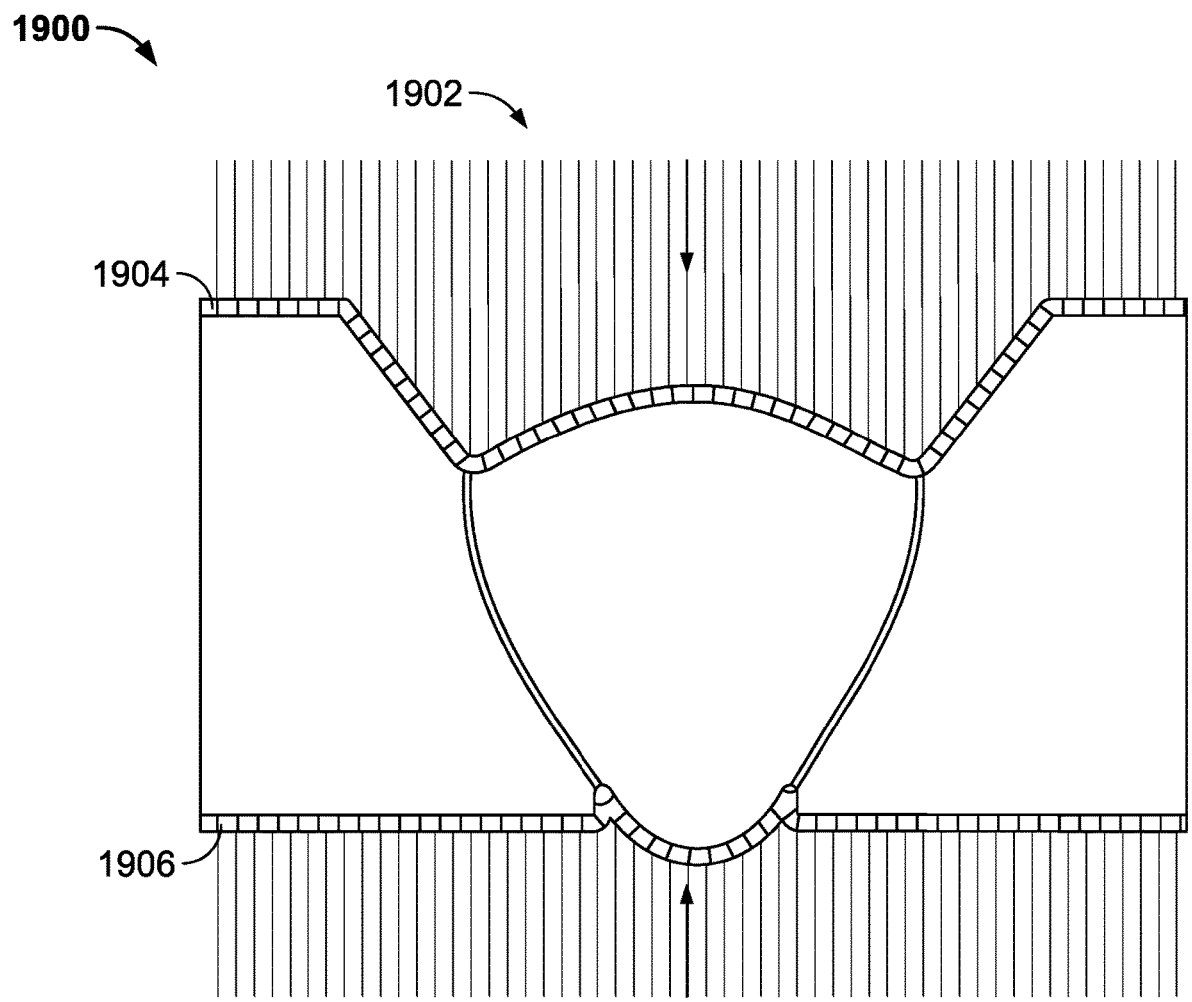
FIG. 19 illustrates an example sampling of a visible surface of a welding result for an example slice.

When there are no more slices for merging (e.g., all of the affected slices have been merged with the prior weld puddle) (block 1414), at block 1416 the weld solver 208 resamples all of the affected slice polygons to a selected resolution. Example sampling resolutions may be between 0.1 mm and 1 mm (0.004 inches and 0.04 inches). An example sampling resolution is 0.5 mm (0.02 inches). FIG. 19 illustrates an example sampling of visible surfaces of a welding result (e.g., a bead) for an example slice 1900. The example slice of FIG. 19 illustrates a sampling resolution as vertical lines corresponding to a sampling function 1902. A front (or top) surface 1904 and a rear (or bottom) surface 1906 are sampled to determine the respective positions.

The example instructions 1400 then end and return control to block 1110 of FIG. 11.

Returning to FIG. 11, following block 1108, the slice manager 212 has stored slice geometry data and sample data for the previous slices and for slices within the weld puddle for the current step. At block 1110, the bead renderer 216 generates a coarse triangle mesh based on cross-sections (e.g., slices) of the simulated weld bead and the updated weld puddle.

Figure 20:
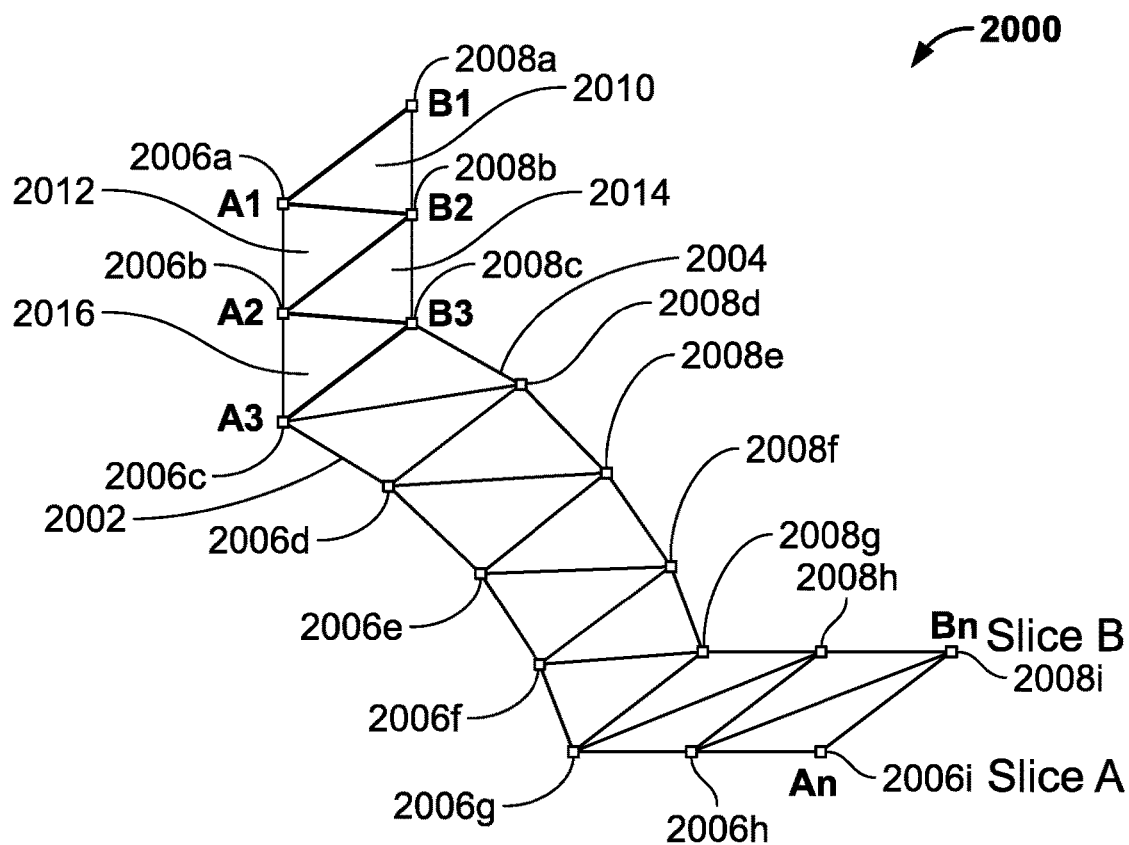
FIG. 20 illustrates an example construction of a triangular mesh, which may be performed by the example bead renderer of FIG. 2, for rendering two adjacent slices based on polygonal weld bead shapes calculated for the slices.

FIG. 20 illustrates an example construction of a triangular mesh 2000, which may be performed by the example bead renderer 216 of FIG. 2, for rendering two adjacent slices 2002, 2004 based on polygonal weld bead shapes calculated for the slices. Each of the example slices 2002, 2004 is represented be multiple sampled points 2006a-2006i, 2008a-2008i. The sampled points 2006a-2006i, 2008a-2008i are generated based on the polygonal data for the slices (e.g., block 1416 of FIG. 14). For ease of reference, certain ones of the sampled points of FIG. 20 are marked A1, A2, A3 (for sampled points on Slice A 2002) and B1, B2, B3 (for sampled points on Slice B 2004).

The bead renderer 216 constructs the triangle mesh by connecting sets of three points, such that connections (i.e., vertices in FIG. 20) do not overlap. As illustrated in FIG. 20, a first triangle 2010 is constructed between samples A1, B1, and B2. A second triangle 2012 is constructed between samples A1, A2, and B2. A third triangle 2014 is constructed between samples A2, B2, and B3. A fourth triangle 2016 is constructed between samples A2, A3, and B3. Additional triangles are constructed for the remaining sets of example samples 2006c-2006i, 2008c-2008i to form a triangle mesh between the adjacent slices 2002, 2004.

Figure 21:
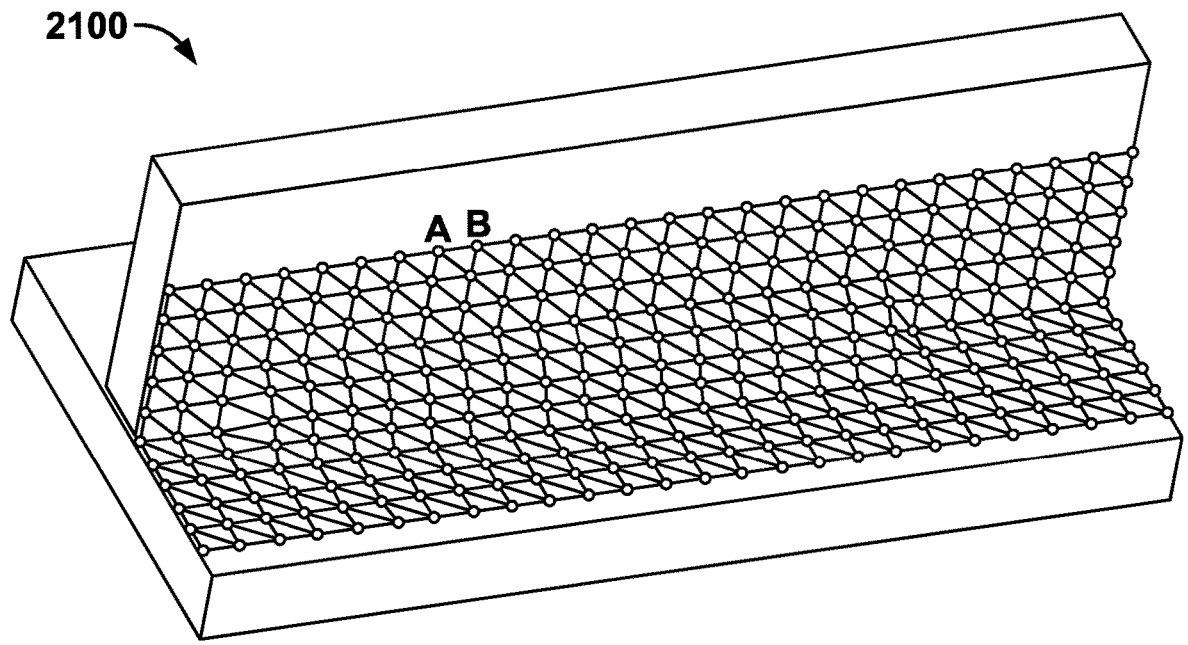
FIG. 21 illustrates an example construction of a triangular mesh, which may be performed by the example bead renderer of FIG. 2, for rendering a weld bead over multiple slices including the example slices of FIG. 20.

FIG. 21 illustrates an example triangular mesh 2100, which may be constructed by the example bead renderer 216 of FIG. 2, for rendering a weld bead over multiple slices including the example slices 2002, 2004 of FIG. 20. Adjacent slices in FIG. 21 are connected with a triangle mesh in an identical manner as described above with reference to FIG. 20. The example triangular mesh of FIGS. 20 and 21 is scalable. The number of triangles can be increased or decreased by increasing or decreasing (respectively) the number of samples of the slice polygon surfaces.

Figure 22A:
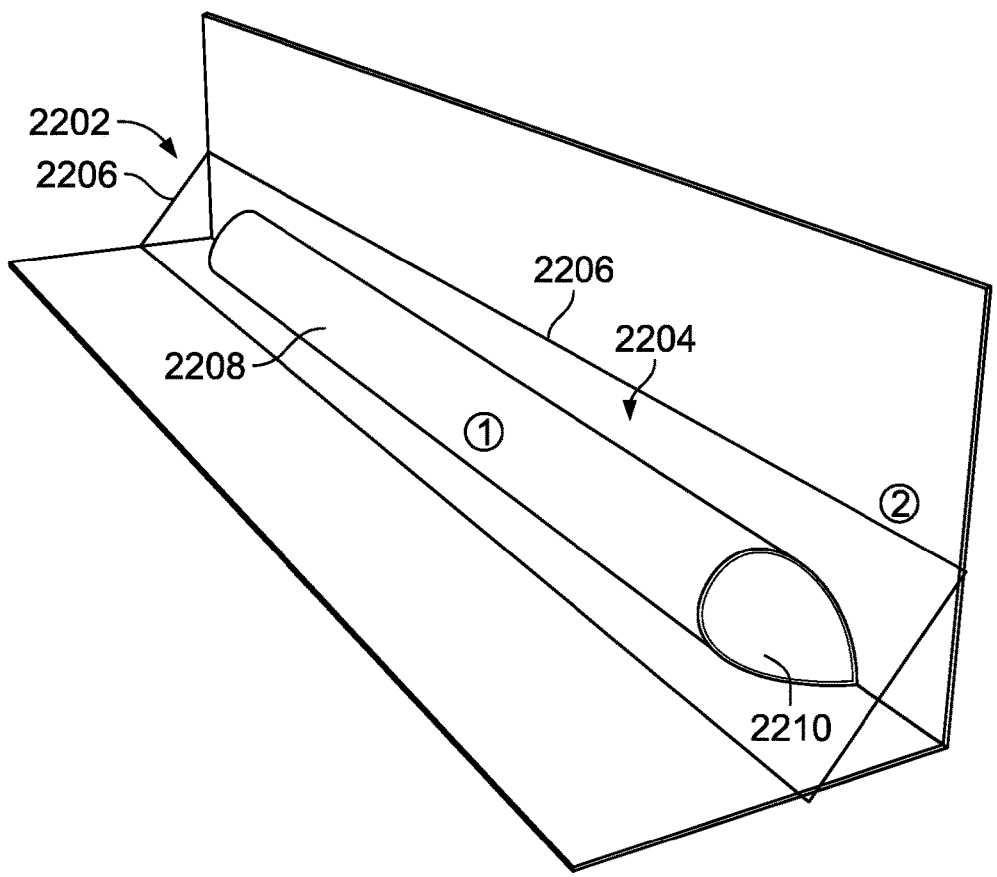
FIG. 22A illustrates an example projection by the bead renderer of FIG. 2 of a weld result onto a two-dimensional image space.
Figure 22B:
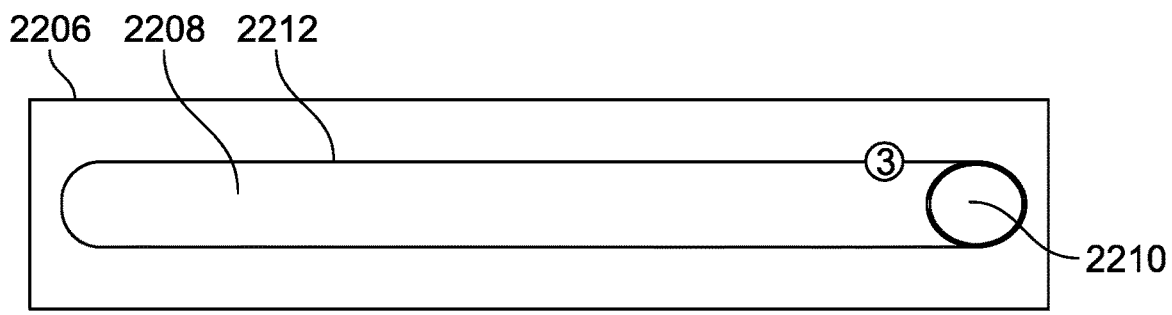
FIG. 22B illustrates an outline of the weld bead portion and an outline of the weld puddle portion as projected onto the two-dimensional image space of FIG. 22A.

Returning to FIG. 11, at block 1112 the bead renderer 216 projects the weld result (e.g., the three-dimensional representation of the weld bead and the weld puddle, as the generated triangular mesh) onto a two-dimensional image space. FIG. 22A illustrates an example projection 2202 by the bead renderer 216 of a weld result 2204 onto a two-dimensional image space 2206. The weld result 2204 of FIG. 22A includes a weld bead portion 2208 and a weld puddle portion 2210. FIG. 22B illustrates an outline 2212 of the weld bead portion 2208 and an outline of the weld puddle portion 2210 as projected onto the two-dimensional image space 2206. In addition to generating the projection, the example bead renderer 216 may also generate an inverse projection.

Following block 1112, the bead renderer 216 has generated a coarse geometry of the simulated weld bead. At block 1114, the bead renderer 216 draws finer surface detail onto a set of images. The surface detail may be overlaid onto the projection generated in block 1112 to improve a visual quality of the weld bead. The example bead renderer 216 generates additional data for the surface detail using a two-dimensional image format, which improves performance of the simulation. Example surface detail includes: a color map, a normal map, a heat affected zone (HAZ) map, and a weld puddle map. The bead renderer 216 stores the color map as a Red, Blue, Green, Opacity (RGBA) image, in which color information is stored using the RGB channels and surface type information is stored in the A channel. The normal map is stored as an RGB image, in which micro-geometry information is stored using the RGB channels. The HAZ map is stored as an RGBA image, in which the HAZ color is stored in RGB channels and HAZ strength is stored in the A channel. The weld puddle map is stored as an RGB image, in which the RGB channels store information used to render the weld puddle and incandescence of the simulated weld bead.

The color map, the normal map, the HAZ map, and/or the weld puddle map may be calculated by referencing the example simulation database 210 based on weld bead characteristics. The example simulation database 210 may be populated with color information, micro-geometry information, surface type information, heat affected zone color, heat affected zone strength, weld puddle color, and/or weld puddle incandescence information by using empirical observations performed with real welding. For example, a real weld (or other filler operation) may be performed with known parameters. By capturing images before, during and/or after the operation, color information, micro-geometry information, surface type information, heat affected zone color, heat affected zone strength, weld puddle color, and/or weld puddle incandescence information may be extracted from the images and correlated with the known parameters. While larger numbers of samples of known parameters are generally better for accuracy, some blending and/or extrapolation between samples of known parameters may be used to calculate color information, micro-geometry information, surface type information, heat affected zone color, heat affected zone strength, weld puddle color, and/or weld puddle incandescence information from stored data in the simulation database 210.

Each of the images representing the color map, the normal map, the heat affected zone (HAZ) map, and the weld puddle map may use a different resolution, based on the desired amount of detail. In some examples, the images have pixel counts that are a power of two to improve performance (e.g., both width and height, in pixels, or 306, 512, 1024, 2048, 4096 or 8192 pixels). The images provide additional surface detail to the appearance of the simulated weld bead. The resolutions of the surface detail maps may be substantially higher (e.g., several times higher) than the resolution of the coarse geometry. At each step of the simulation (e.g., each frame), the set of images is updated and new information is generated.

At block 1116, the bead renderer 216 projects surface detail from the set of surface detail images (e.g., as mapped to the two-dimensional image space 2206 of FIGS. 22A and 22B) onto the weld bead surface. For example, the outline of current weld puddle is projected into the two-dimensional image space to map onto surface detail images (e.g., for consistent orientation of the images in the set). The surface detail information projected from the set of images onto the workpiece and simulated weld bead are used to determine illumination and final color of the workpiece and the simulated weld bead. Illumination may be based on, for example, the presence or absence of a simulated weld arc and a simulated darkening of a welding helmet.

At block 1118, the bead renderer 216 combines the triangle mesh geometry and the projected surface detail to produce and output the weld result (e.g., to the display(s) 106 of FIG. 1). For example, the set of images are projected to the triangle mesh geometry using the inverse projection generated by the bead renderer 216. While the weld bead and weld puddle information have been determined, the final image produced on the display(s) 106 may involve further processing such as resampling based on the display resolution, applying bloom filters based on pixel energy, and/or generating and rendering additional information such as virtual indicators or helper icons to assist the welder with the weld. Example virtual indicators may be displayed to assist with work angle, travel angle, travel speed, contact tip to work distance, and/or any other information.

The example instructions 1100 may then end.

When the welder is viewing a back side of the workpiece (e.g., a side of the workpiece opposite the side where the weld bead was placed), the example instructions 1100 execute in the same manner, but display the opposite surface of the weld bead due to the recognition by the marker detector 202 of markers placed on the back side of the workpiece.

While example simulation techniques are described, additional or alternative characteristics or considerations may be added to the simulation techniques. Due to the calculation of bead cross-section and lateral profile separately, as well as modular performance of weld bead geometry calculation and weld bead rendering, disclosed example systems and methods are easily updated to take into account such newly-developed characteristics. Examples of such characteristics may include considering the influence of gravity on the weld puddle, indicating additional and/or specific welding defects such as under-bite, and/or considering the adequacy of preparation of a workpiece prior to welding when determining weld geometry and/or defects.

Figure 23A:
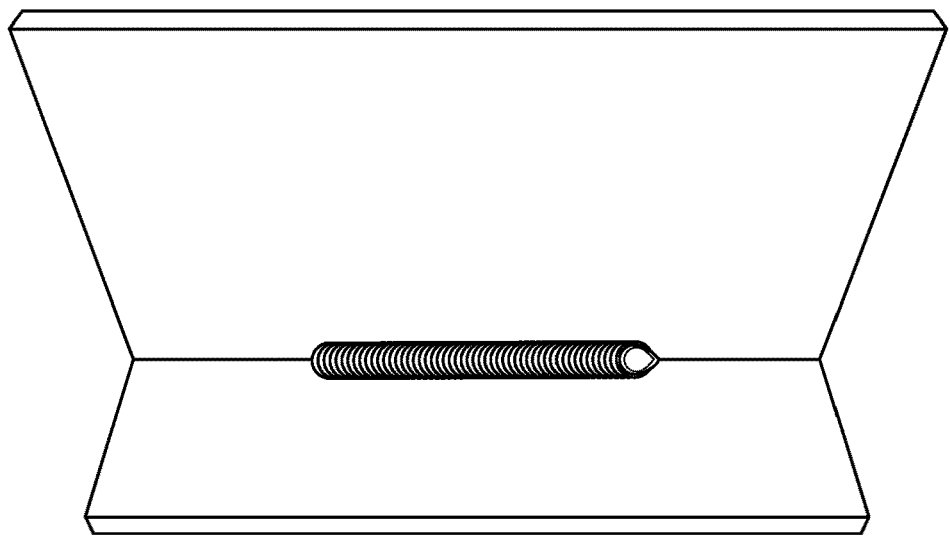
FIGS. 23A-23C illustrate views of an example calculated and rendered root pass using the example systems and methods disclosed herein.
Figure 23B:
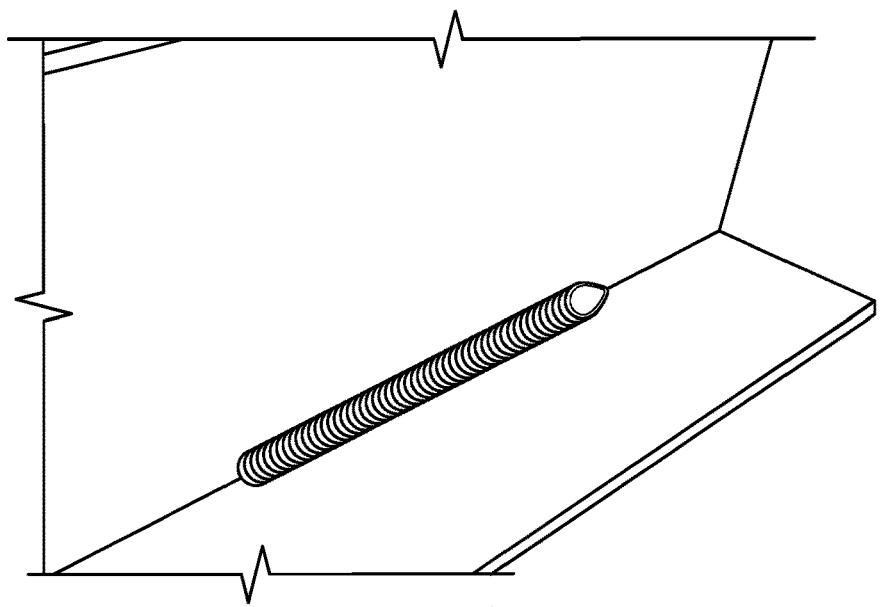
Figure 23C:
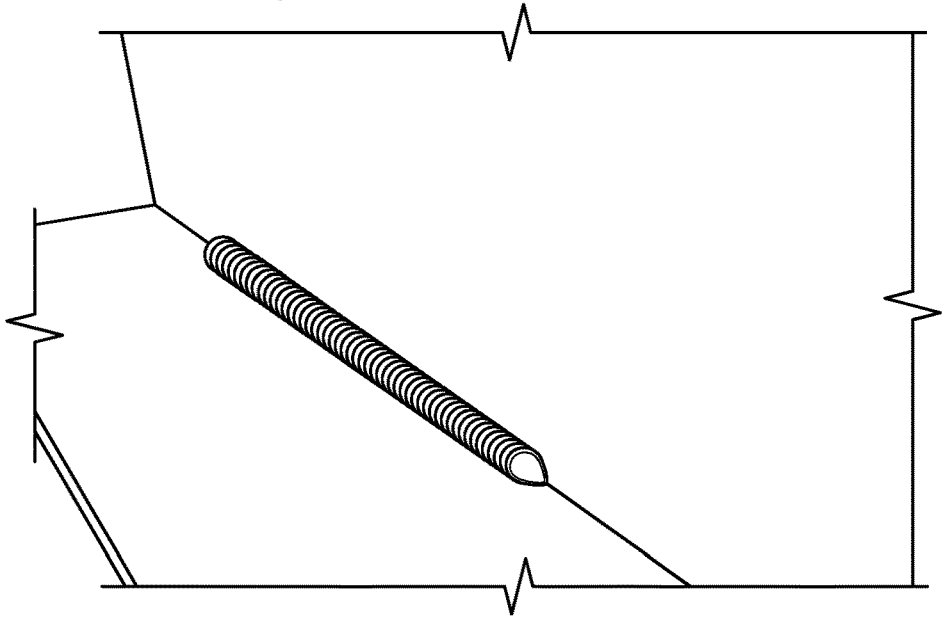

FIGS. 23A-23C illustrate an example calculated and rendered root pass using the example systems and methods disclosed herein. The realism of the illustrated weld bead is superior to that of conventional simulation techniques utilizing comparable computing resources.

Figure 24:
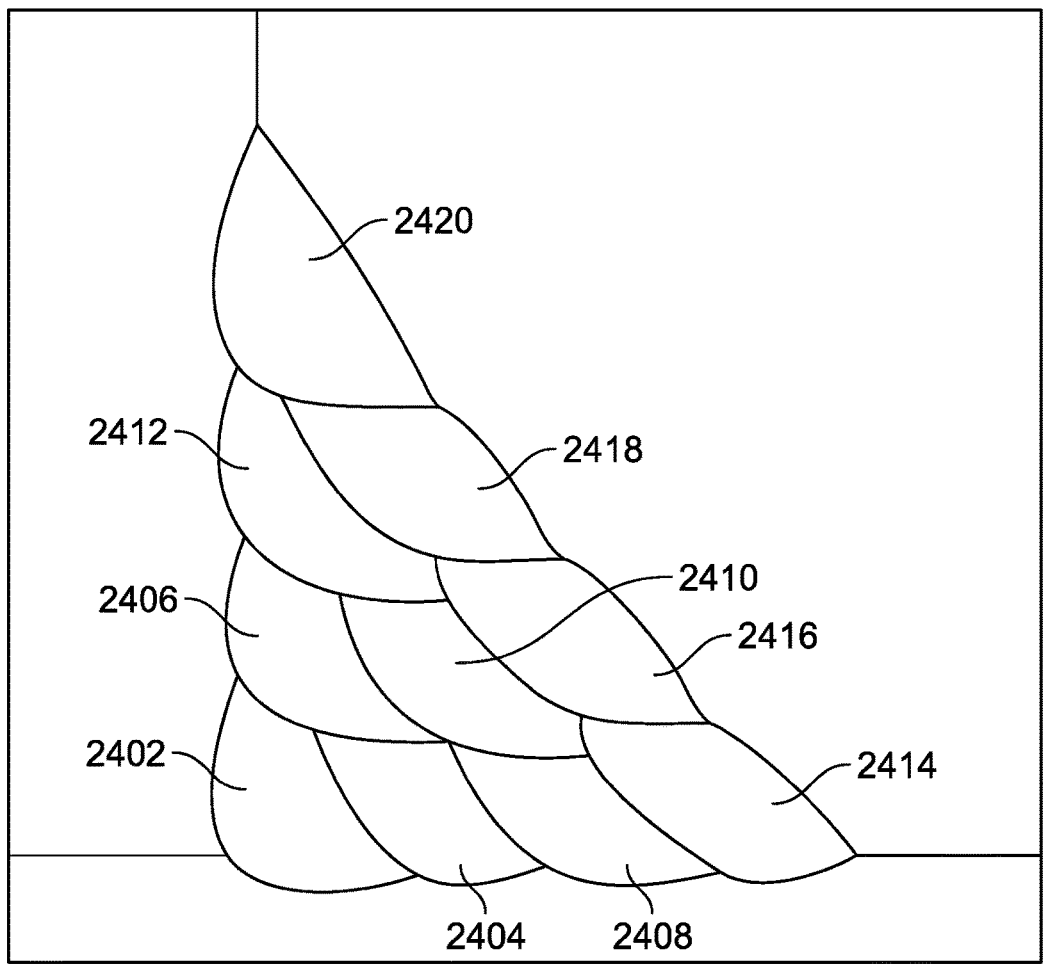
FIG. 24 illustrates an example slice onto which multiple simulated weld passes are made for a single weld joint.

FIG. 24 illustrates an example slice 2400 onto which multiple simulated weld passes 2402-2420 are made for a single weld joint. In the example of FIG. 24, as many as 10 weld passes may be simulated. When simulating subsequent weld passes, the same or similar weld simulation techniques and rendering techniques described herein may be used as for the initial weld pass. For example, the sampling of the surface 1504 illustrated in FIG. 15A is performed based on slice data stored by the slice manager 212. Instead of the sampled surface being identical to the surface of the underlying workpiece 1508, at least a portion of the sampled surface would include the resultant surface of previously deposited weld passes.

The example simulation database 210 stores data representative of the effects of adding a weld pass to weld joint having one or more prior weld passes. The volume of prior passes (e.g., a combination of workpiece and filler volume) is also considered when adding filler volume during subsequent passes, such as by adding, moving, and/or removing control points, and/or by adjusting the polygons and/or outlines from prior passes to subsequent passes.

Figure 25:
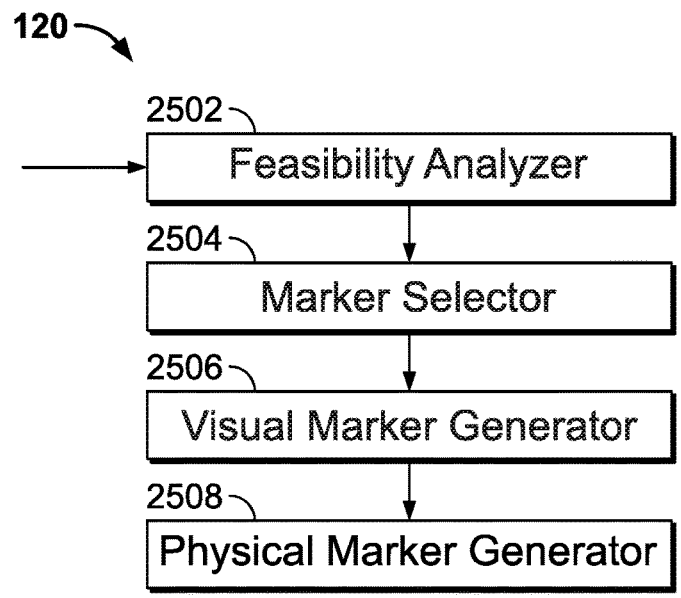
FIG. 25 is a block diagram of an example implementation of the workpiece modeler 120 of FIG. 1.

FIG. 25 is a block diagram of an example implementation of the workpiece modeler 120 of FIG. 1. The example workpiece modeler 120 enables simulation of real mechanical parts (e.g., the part 122) by the weld training system 100 of FIG. 1. For example, simulation on real mechanical parts using a manual welding process may be used for operator training on the real mechanical parts before actually welding the parts. By simulating the weld on the real mechanical parts beforehand, the example weld training system 100 described herein can improve manual weld quality by providing prior simulated welding repetition to the operator (without the associated costs of actual welding).

The example workpiece modeler 120 receives as inputs: one or more computer-aided design (CAD) models or other digital models of the desired custom part, the locations of the welding beads to be performed on the part, and a weld procedure specification. A model of the physical part 122 corresponding to the CAD model is also used in conjunction with the workpiece modeler 120. Instead of or in addition to a CAD model generated using a drafting program, the example workpiece modeler 120 may receive a three-dimensional scan of the workpiece (e.g., generated using a laser scanner or other three-dimensional object scanning device).

The workpiece modeler 120 creates a marker layout file specifying the position, size, and/or orientation of visual markers on the physical part 122. The marker layout file is provided to the weld training system 100 with a definition of the workpiece. The workpiece modeler 120 may further output stickers of markers and/or other types of markers for physical attachment to the physical part 122.

The workpiece modeler 120 includes a feasibility analyzer 2502, a marker selector 2504, a visual marker generator 2506, and a physical marker generator 2508.

The feasibility analyzer 2502 analyzes the CAD model of the workpiece to verify compliance with feasibility rules. For example, feasibility analyzer 2502 may determine whether the physical workpiece size meets limitations in one or more dimensions. Additionally or alternatively, the proposed weld trajectories to be performed on the workpiece may be subject to length limitations, viewing angle limitations, and/or obstructions that could limit the placement of markers and/or limit the ability of the simulator 102 to recognize and/or render the workpiece and/or welds. For example, a workpiece that involves performing a first weld, then fitting a sub-component of the workpiece over the first weld to assemble the location of a second weld may be restricted.

In some examples, the feasibility analyzer 2502 determines whether sufficient surface area is present on the workpiece near the locations of weld trajectories to enable the selection and/or placement of markers. The feasibility analyzer 2502 may determine whether minimum and/or maximum working distances are achievable for performing welds on the defined weld trajectories.

The marker selector 2504 analyzes the workpiece model to analyze key points that may be used as natural markers, and/or to select locations, sizes, and/or orientations of additional markers to be attached or affixed to the physical part 122. In some examples, the key point identifier 2504 determines locations onto which physical stickers, containing the visual markers, are to be attached. As described in more detail below, the marker selector 2504 selects numbers, positions, sizes, and/or orientations for added markers to increase (e.g., optimize) detection accuracy.

The example marker selector 2504 determines area(s) for marker placement based on the weld trajectories. The physical part 122 is not necessarily covered in markers. The marker selector 2504 may determine two different types of areas as mandatory marker areas and optional marker areas. Mandatory marker areas are designated areas in which markers are placed near a weld trajectory to ensure an accurate detection by the marker identifier 202 of FIG. 2. Markers can have different sizes to allow the detection at different distances. Conversely, optional marker areas may include markers to improve the detection experience. For example, after placing the mandatory markers, the physical part may have areas that are devoid of markers. In such a case, additional markers, such as larger markers, can be placed to extend the maximum distance of detection of the workpiece by the marker identifier 202.

When the mandatory markers are selected under preferred conditions (e.g., no curvature, correct lighting, and correct focus), example working distances (e.g., distance of detection) may be between about 10 centimeters (cm) and about 80 cm. The detection range (e.g., minimum and/or maximum detection distance(s)) can be increased (e.g., widened) by increasing the resolution of the image sensor(s) 104. For example, the marker detector 202 can operate with camera resolutions of 600×800 pixels, but may increase the maximum working distance, by using higher resolutions (e.g., up to 4,000×4,000 pixels, 8,000×8,000 pixels, or other resolutions greater than 600×800).

The marker selector 2504 determines the coordinates of each marker position using one or more plane projections of each marker's surface onto the surface of the digital part. In some examples, the marker selector 2504 designates marker positions to place the markers on flat surfaces and/or surfaces with small curvature. The selected positions of the markers may also be determined using the plane projection of the welding trajectories for which the markers are placed.

The marker selector 2504 may select numbers, positions, sizes, and/or orientations of one or more markers based on restricting a number of available markers that can be used on the physical part 122. Each marker is uniquely identifiable, such as being a two-dimensional barcode representative of unique data. The resolution of the markers and/or the inter-marker data separation (e.g., inter-marker Hamming distances) may limit the number of markers that are available. In some examples, the number of available markers may be limited to approximately 1000. The number of available markers may be increased by increasing the sizes and/or resolution of the markers and/or decreasing inter-marker data separation. A library of 2500 markers can have the same inter-marker distance (e.g., 5 bits) as a library of 1000 markers. A library of more than 15000 markers can have a smaller inter-marker distance of (e.g., 3 bits) at the same resolution, but the difference can be small. However, increasing the resolution of the markers and/or decreasing the inter-marker data separation may increase the probability of erroneous detection of markers and/or increase the time (or computing resources) required by the marker detector 202 to detect markers, thereby affecting frame rate of the simulation. However, error correction techniques may be employed to reduce the probability of erroneous detection of markers.

The marker selector 2504 may select numbers, positions, sizes, and/or orientations of one or more markers based on restricting a number of markers applied or attached to the part. A large number of markers affects the efficiency of detection by the marker detector 202. If a part has a number of markers that, if observed simultaneously, would affect the detection performance, but the markers are not simultaneously visible in the image, the efficiency of the detection is not substantially affected. However, if the part has too many markers and the markers are visible simultaneously, the efficiency of the detection can be affected. Simultaneous viewing of more than a threshold number of markers could occur when optional markers are used to detect the coupon in further distances, and when a large number of small markers surrounding the welding bead are simultaneously visible. In such cases, the efficiency of the detection can be affected. For example, a part with 100 simultaneously visible markers may have a detection time of 7 milliseconds (ms), whereas a part with more than 1000 simultaneously visible markers may have a detection time of about 9 ms. In some examples, the marker detector 202 may use techniques to improve detection efficiency when more than a threshold number of markers are simultaneously visible on the physical part 122.

The marker selector 2504 may select marker sizes based on proximity of a given marker to a weld trajectory and/or based on a desired maximum detection range. In some examples, the marker selector 2504 does not have a minimum physical size, because the detection of a marker depends on the marker's projection in an image, the camera distance, and the image resolution, rather than does not depend on the physical size of the marker. For example, a marker having a size of 25 millimeters (mm)×25 mm can be sufficient to detect a marker, based on factors such as viewing angle, lighting, focus, and/or resolution.

Figure 26:
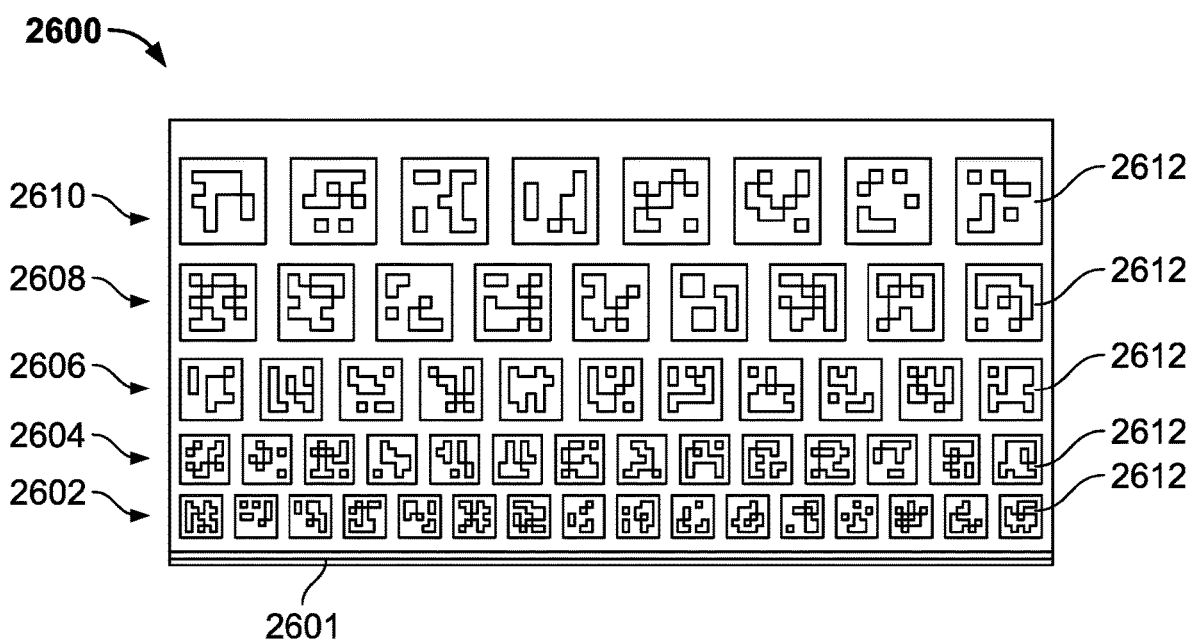
FIG. 26 illustrates an example part having a weld trajectory and multiple rows of markers.

In some examples, the marker selector 2504 sets the size of the markers to increase in a progressive way as the distance between the weld trajectory and the marker increases. FIG. 26 illustrates an example part 2600 having a weld trajectory 2601 and multiple rows 2602-2610 of markers 2612. For example, as depicted in FIG. 26, the rows 2602-22610 of markers start with a marker size of 1.4 cm and increase up to 3 cm. In the part shown in FIG. 26, the sizes of the markers 2612 are: Row 1 2602: 1.4 cm; Row 2 2604: 1.6 cm; Row 3 2606: 2.1 cm; Row 4 2608: 2.6 cm; and Row 5 2610: 2.9 cm.

If the markers cannot be placed due to available space (e.g., in a small-diameter pipe such as a 2 inch pipe), the upper detection distance limit is reduced. In some examples, an increase in image sensor resolution can be used to reduce marker size and/or improve marker detection. Reduction in marker size can also involve a reduction in the lower detection distance limit.

The marker selector 2504 may select sizes for markers based on the available surface for the mandatory markers. For example, if the available surface proximate the weld trajectory is small (e.g., less than 20 cm) and visible during an exercise. The size of the surface for the mandatory markers may depend on the welding bead length. For example, it is estimated that, for every 10 cm of bead, a surface of 200-300 $cm^2$ may be required or a ratio of between 20 and 30 marker placement surface ($cm^2$) to bead length (cm). Smaller ratios can affect the maximum working distance. The surface for the mandatory markers can be distributed on one or more sides of a weld trajectory.

The marker selector 2504 may place markers close to the weld trajectory to avoid affecting detection. Discontinuities in the stickers (e.g., holes in the part, etc.) can be allowed provided that the surface ratio is not affected.

The marker selector 2504 does not necessarily require a minimum length for a weld trajectory or weld bead. However, as described above, an effect lower limit on the size of a marker may be present, which can affect the lower limit of the proximate weld trajectory.

The maximum length of a weld trajectory on a part can depend on the number of available markers. For example, for every 10 cm of welding bead, the marker selector 2504 may place between 30-40 markers. If the marker selector 2504 has an upper limit on the number of available markers in the marker library, the marker selector 2504 may place an upper limit on the length of a weld trajectory. For a library of approximately 980 markers designated for mandatory markers only, using the example ratios described above, the marker selector 2504 may limit the length of the weld trajectory to 250-330 cm.

In some cases, the marker selector 2504 may reuse markers for different sections of the welding bead to achieve longer upper lengths for a weld trajectory. In some examples, the number of markers can be increased to allow for the simulation of a welding bead having a greater length.

Based on the selection and characteristics of markers determined by the marker selector 2504, the visual marker generator 2506 generates a marker layout file mapping the physical part to the markers. The marker layout file includes the three-dimensional distribution of the markers, and is the marker layout file may be determined based on the planes, orientations, sizes, positions (e.g., coordinates), edges, and/or discontinuities of the selected markers. The marker layout file is used by the example simulator 102 to recognize the position and orientation of the physical part 122 within a field of view of the image sensor(s) 104, based on mappings of identified markers to positions. As described above, the positions and reference frames of the weld joints (e.g., weld trajectories), weld beads, and/or slices are defined with reference to the workpiece reference frame identified by the marker detector 202 using the marker layout file.

The example visual marker generator 2506 generates a physical image of the markers for application to the physical part 122. For example, the visual marker generator 2506 may generate an image file for printing onto one or more stickers, which can then be physically attached to the physical part 122 (printed by the physical marker generator 2508 and placed on the physical part 122). The resulting image file can be an image of a sticker with the markers included. In other examples, the markers may be painted or otherwise affixed or attached to the physical part 122 by the physical marker generator 2508.

The physical marker generator 2508 creates physical representations of the visual markers. As mentioned above, example physical representations may include stickers, clings, paint, screen prints, and/or any other physical embodiment that can be attached to corresponding locations on the physical part 122. In some examples, the physical marker generator 2508 combines multiple markers (e.g., adjacent markers or fields of markers) onto a same substrate that can be attached to the physical part 122 with a particular alignment provided by the physical marker generator.

The stickers can be printed out and placed in the same position on the real part (e.g., coupon) as in the model output from the Marker Layout File. The example stickers may be combined with application instructions, such as alignment instructions of the stickers to features of the physical part 122.

After creation of the marker layout file and attachment of the markers to the physical part 122, the physical part, the marker layout file, and the weld procedure specification is delivered to the weld training system 100. The example weld training system 100 renders the workpiece with a workpiece reference frame as described above. Instead of extruding the workpiece from a cross-section as with standard workpiece types, the example reference frame generator 204 uses workpiece points and/or functions to define the locations of the workpiece and the weld joints within the workpiece reference frame. Weld operations are then simulated by the example simulator with reference to weld joint reference frames and slice spaces as described in detail above.

Figure 27:
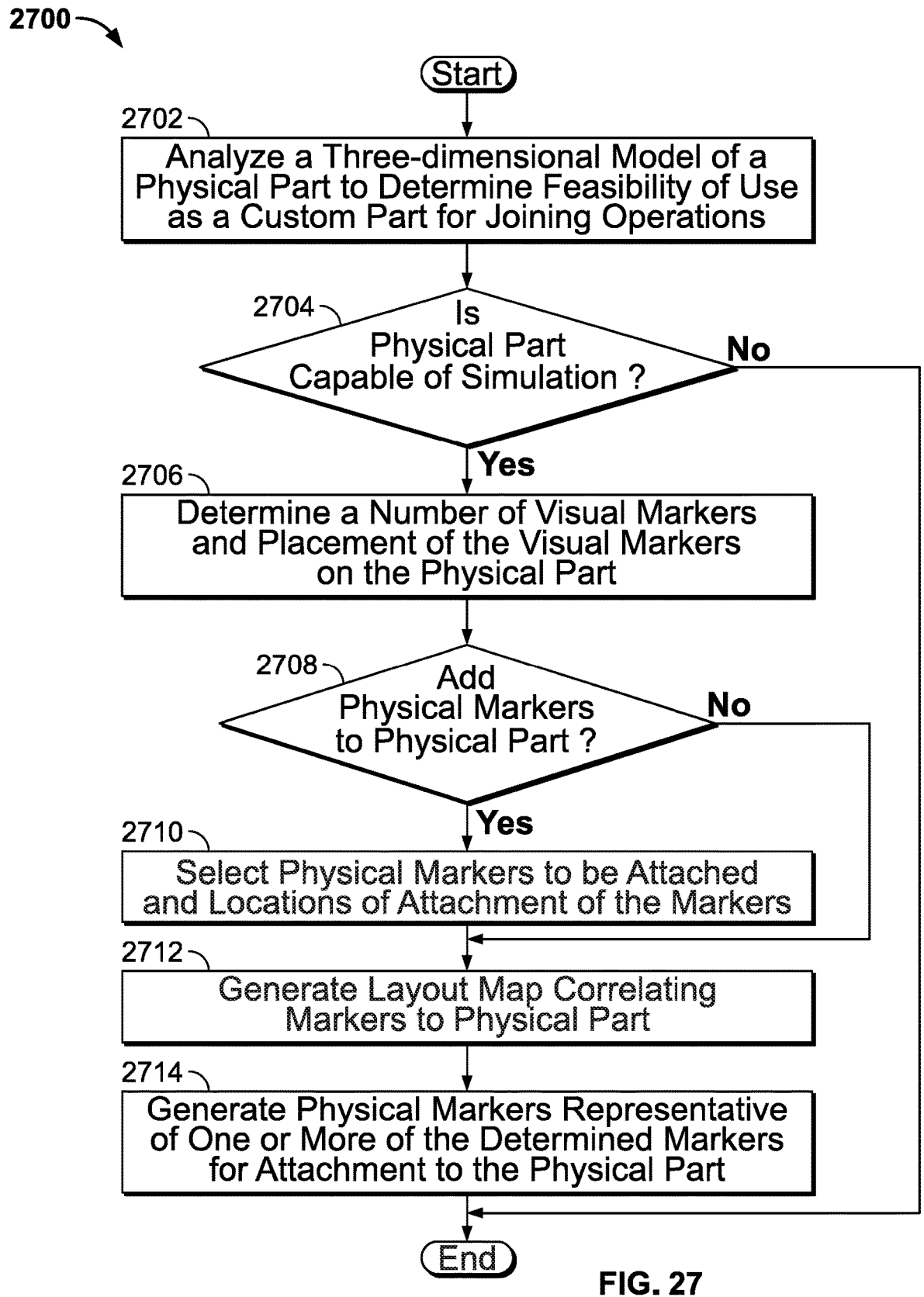
FIG. 27 is a flowchart representative of example machine readable instructions which may be executed by the example workpiece modeler of FIG. 25 to create a custom part for use in simulated joining operations by the weld training system of FIG. 1.

FIG. 27 is a flowchart representative of example machine readable instructions 2700 which may be executed by the example workpiece modeler 120 of FIG. 25 to create a custom part for use in simulated joining operations by the weld training system 100 of FIG. 1.

At block 2702, the feasibility analyzer 2502 analyzes a 3D model of a physical part (e.g., the physical part 122 of FIG. 1) to determine feasibility of use as a custom part for joining operations. At block 2704, the feasibility analyzer 2502 determines whether the physical part 122 is capable of simulation. If the physical part 122 is capable of simulation (block 2704), at block 2706 the marker selector 2504 determines a number of visual markers and a placement of the visual markers on the physical part 122. The determined number and placement of the visual markers may include features of the physical part 122 itself and/or added markers.

At block 2708, the marker selector 2504 determines whether to add physical markers to the physical part 122. For example, the marker selector 2504 may determine that additional markers are needed if intrinsic features of the physical part 122 do not provide sufficient marking ability. If physical markers are to be added to the physical part 122 (block 2708), at block 2710 the marker selector 2504 selects physical markers to be attached and locations of attachment of the markers. For example, the marker selector 2504 may select markers and/or locations based on one or more of a number of available markers, a weld bead length, available marker attachment areas, and/or any other factors.

After selecting the physical markers (block 2710), or if physical markers are not to be added (block 2708), at block 2712 the visual marker generator 2506 generates a marker layout map correlating the markers (e.g., selected intrinsic markers and/or added markers) to the physical part 122. For example, the marker layout map may include a three-dimensional mapping of the markers onto the surfaces of the physical part 122.

At block 2714, the physical marker generator 2508 generates any added physical markers to be representative of the determined markers for attachment to the physical part 122. For example, the physical marker generator 2508 may generate one or more image files for producing stickers or other substrates, including one or more of the markers to be attached to the physical part.

After generating the physical makers (block 2714), or if the physical part 122 is not feasible for simulation (block 2704), the example instructions 2700 end.

Figure 28:
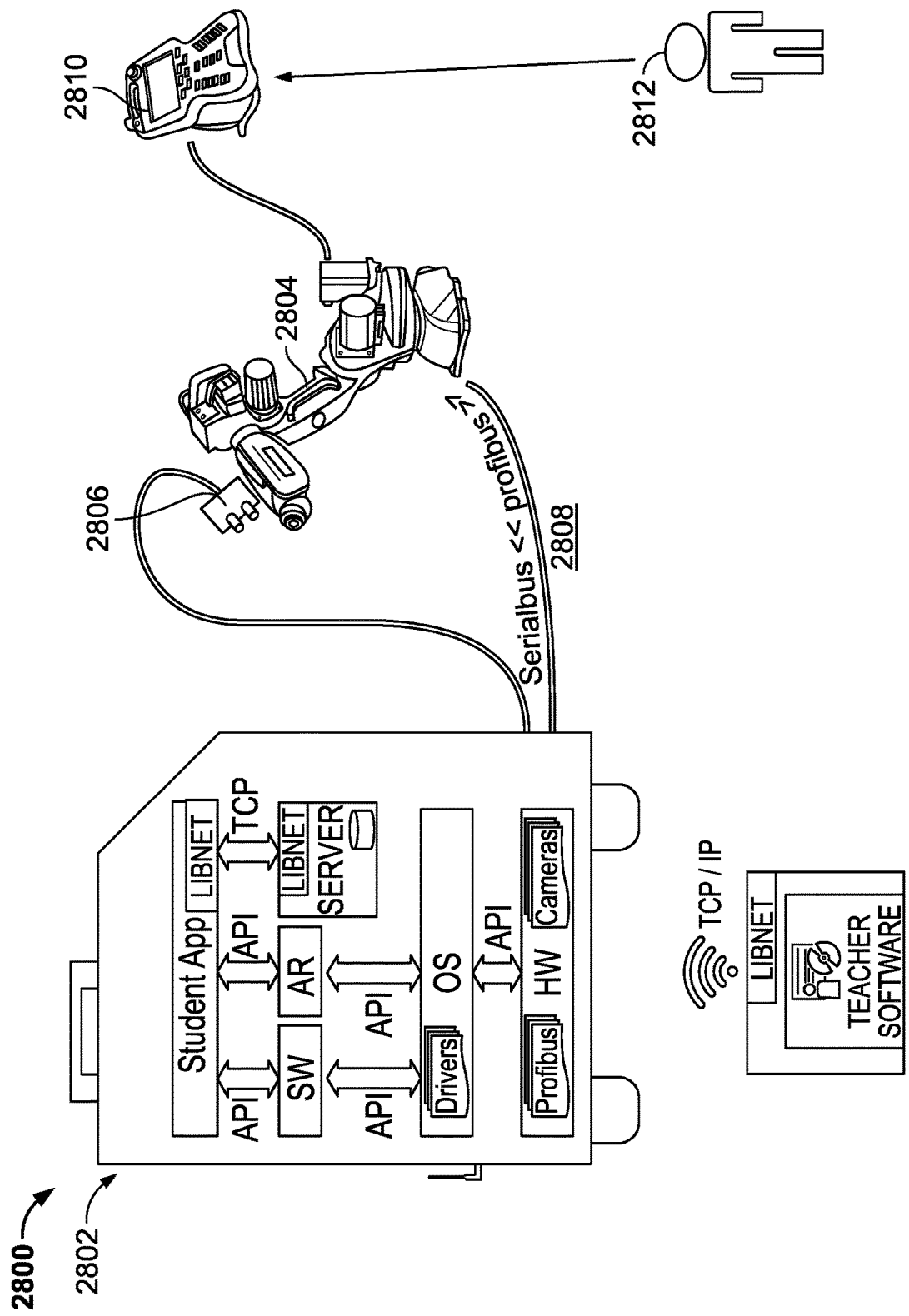
FIG. 28 is a block diagram of an example robotic weld training system that may be used to train an operator to program a robot to perform joining operations on a workpiece by simulating robotic joining activity, in accordance with aspects of this disclosure.

FIG. 28 is a block diagram of an example robotic weld training system 2800 that may be used to train an operator to program a robot to perform joining operations on a workpiece by simulating robotic joining activity. The example robotic weld training system 2800 provides an augmented reality simulation system that can connect to multi-axis robots (e.g., robotic devices that can operate and/or move in multiple axes) to train robotic welding, and simulate the behavior of a welding power source or other equipment that is compatible with the robots.

The example weld training system includes a simulator 2802, a robot 2804, one or more image sensor(s) 2806, a robot interface 2808, and a robot controller 2810. A user 2812 may control or program the robot 2804 using the robot controller 2810 and view a simulation result generated by the simulator 2802. For example, the simulator 2802 may include or be connected to one or more display device(s).

The example simulator 2802 performs simulation of a joining operation as described in more detail above. For example, the simulator 2802 includes the marker detector 202, the reference frame generator 204, the weld parameter detector 206, the weld solver 208, the simulation database 210, the slice manager 212, the cross-section renderer 214, and the bead renderer 216 of FIG. 2. The simulation may be performed on standard and/or custom parts. For example, customized parts may provide tailored training for an operator to experiment with programming the robot 2804 to weld a part that is to be manufactured, without the time and expense necessary to program the robot operator 2804 on actual parts.

In some examples, the robotic weld training system 2800 operates as an extension of an augmented reality simulation system for training manual welding. For example, the robotic weld training system 2800 can be implemented to provide a robotic welding training device as an additional option of an augmented reality welding system, including any additional hardware and/or software, and/or as a dedicated robot and augmented reality simulation system as an independent system, including specific hardware configurations. Depending on the type of system provided, the specific hardware and/or software implementations can be different. For example, modifications can be made relative to the hardware and/or software provided in a dedicated augmented reality welding system.

The example simulator 2802 and/or the robot interface 2808 may implement one or more software libraries and/or extensions to facilitate and/or manage communication with the robot 2804. For a welding robot, the simulator 2802 may be coupled to a welding power supply interface to which the robot 2804 would be coupled to exchange data and/or commands with an actual power supply. Robotic communication software libraries can abstract the augmented reality welding system from the connected robot 2804 (e.g., the libraries will interpret the inputs/outputs that the robot sends/receives to/from a conventional welding power source, and sends/receives the corresponding data/commands to the augmented reality welding system). In this manner, the software libraries act as a proxy between the robot 2804 and the simulator 2802. Communications may use standardized robot communication formats, such as FIELDBUS and/or TCP/IP, and/or proprietary communication formats.

Example communications, commands, and/or data that may be exchanged between the robot 2804 and the simulator 2802 (e.g., directly or via the robot interface 2808) include: obtaining and/or starting the driver to perform hardware interactions; opening communication channels; exchanging data between the simulator 2804 and the robot 2804, including data reading and/or code writing; starting welding (e.g., start the simulated flow of welding power, gas, and/or electrode); stopping welding (e.g., (e.g., start the simulated flow of welding power, gas, and/or electrode); receiving and/or transmitting status information about the robot and/or simulated power supply; closing communication channels; and/or stopping the hardware driver.

The software libraries may be implemented on designated processing and communications hardware in the separate robot interface 2808, and/or implemented on hardware within the simulator 2802. For example, additional components and/or modifications to existing components of the simulator 2802 may be implemented to execute the software libraries and facilitate communication with the robot 2804. Example components include PHY circuits to support communication protocols.

The example image sensors 2804 are mounted to the robot 2804 to provide visual information similar to the visual information provided by the image sensors 104 of FIG. 1. The images captured by the image sensors 2804 are received at the simulator 2802 and used to simulate the robot operation, such as simulating welding operations as disclosed above. The hardware of the vision module may be different to enable attachment to an arm, torch, and/or torch holder of the robot 2804.

The example robot 2804 may be a conventional and/or commercially available robot to facilitate training of personnel with conventional robot systems. Welding robots manufactured by FANUC, KUKA, Comau, CLOOS, Panasonic, and other robotic and welding system manufacturers may be used for the robot 2804. Additionally, the simulator 2802 and the robot interface 2808 may be used interchangeably with multiple robots, provided that the appropriate communications libraries are available to the simulator 2802 and/or the robot interface 2808.

The example robotic weld training system 2800 may be used in a marketing and/or presale context to promote of robotic devices by demonstrating how the robots can operate, showing the robotic devices, and joining operation results achievable using the robot. Multiple robots and/or simulators may be linked (e.g., by exchanging slice data in real-time as disclosed above) to demonstrate multiple-robot joining operations. For example, a viewer could download an application to a mobile device to enable receiving of the slice data from the robots and to render the results of the multiple-robot joining operations from the slice data on the mobile device.

The example robotic weld training system 2800 may be used in a training context, such as when a welding robot is sold. Conventionally, a seller can provide training including information on how to operate the robot, but does not include basic welding information related to the robotic technology. The lack of basic welding information can result in problems, which has resulted in new regulations on welding training programs. The example robotic weld training system 2800 may be used to provide and/or demonstrate additional welding information and training specific to a robotic device to the purchaser.

The example robotic weld training system 2800 may be used to help robot manufacturers and industrial customers improve robotic manufacturing processes by integrating robotic welding training with augmented reality simulation. The example The example robotic weld training system 2800 connects to the customer's welding robots to train robot operators with a reduced risk of damage to equipment by a novice operator and/or with reduced cost of training.

The example robotic weld training system 2800 enable robotic welding self-learning. For example, the simulator 2802 can provide an evaluation of the simulated weld performed by the robot 2804. The evaluation information can be processed by an artificial intelligence system to tune parameters in the programmed routine in the robot 2804 to improve evaluation results.

Figure 29:
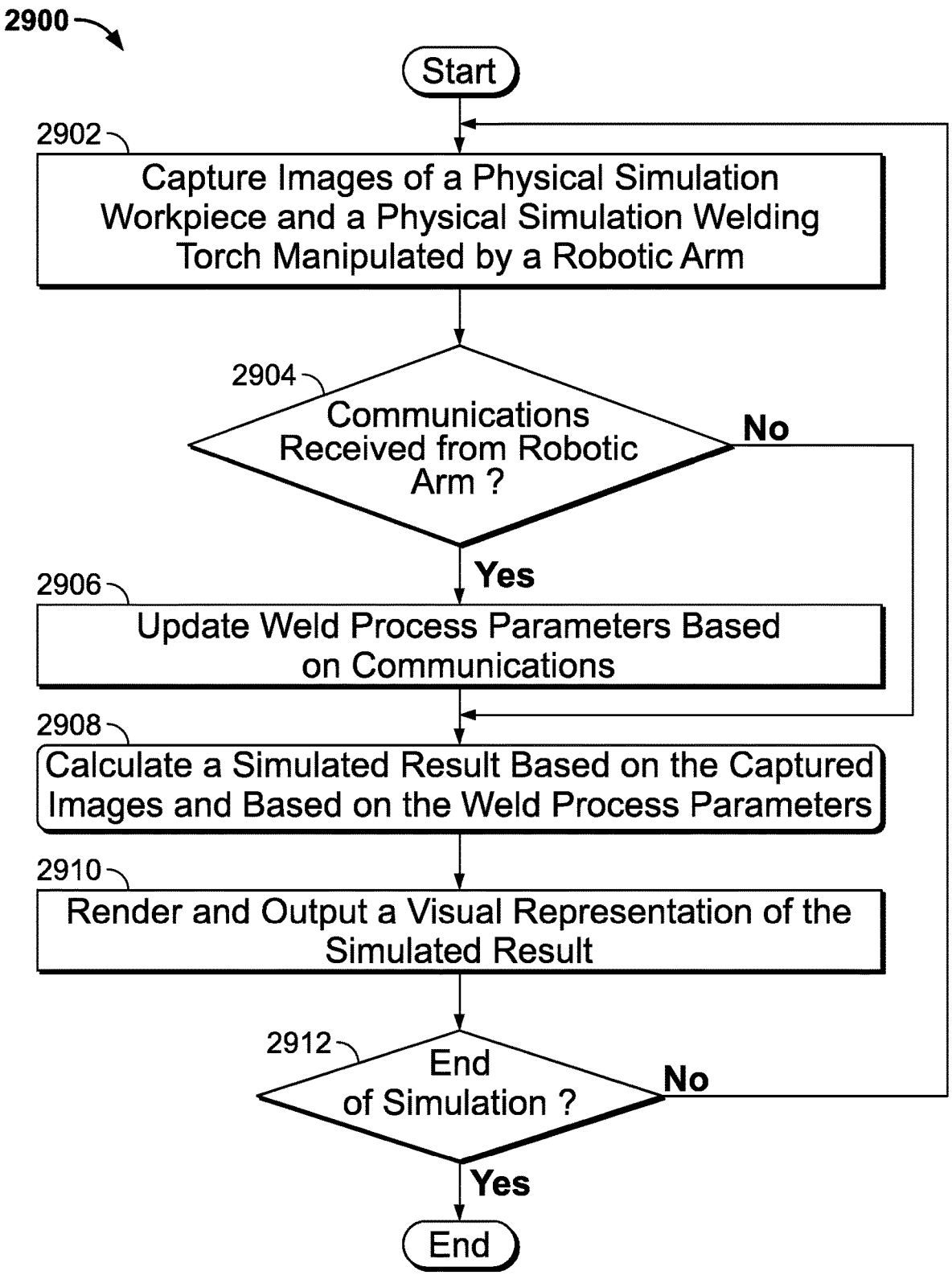
FIG. 29 is a flowchart representative of example machine readable instructions 2900 which may be executed by the example simulator of FIG. 28 to simulate a result of a robot operation on a simulated workpiece.

FIG. 29 is a flowchart representative of example machine readable instructions 2900 which may be executed by the example simulator 2802 of FIG. 28 to simulate a result of a robot operation on a simulated workpiece.

At block 2902, the image sensors 2806 capture images of a physical simulation workpiece and a physical simulation welding torch manipulated by a robotic arm (e.g., the robot 2804 of FIG. 28). At block 2904, the simulator 2802 determines (e.g., via the weld solver 208) whether communications have been received from the robotic arm (e.g., via the robot interface 2808). Example communications that may be received include: obtaining and/or starting the driver to perform hardware interactions; opening communication channels; exchanging data between the simulator 2804 and the robot 2804, including data reading and/or code writing; starting welding (e.g., start the simulated flow of welding power, gas, and/or electrode); stopping welding (e.g., (e.g., start the simulated flow of welding power, gas, and/or electrode); receiving and/or transmitting status information about the robot and/or simulated power supply; closing communication channels; and/or stopping the hardware driver.

If communications have been received (block 2904), at block 2906 the weld solver 208 updates weld process parameters based on the communications. After updating the weld process parameters (block 2906), or if no communications have been received (block 2904), at block 2908 the example simulator 2802 calculates a simulated result based on the captured images and based on the weld process parameters (which may be updated based on robotic communications).

At block 2910, the simulator 2802 renders and outputs a visual representation of the simulated result (e.g., via one or more display devices). Additionally or alternatively, the example simulator 2802 may transmit slice information to other devices for rendering the weld result. The example blocks 2902-2912 may be implemented using the example simulation systems and methods disclosed above with reference to FIGS. 1-27 and, particularly, with reference to the instructions of FIGS. 11, 12, 13, and/or 14.

At block 2912, the simulator 2802 determines whether the simulation is ended. For example, the simulation may end in response to a communication from the robot 2804 and/or a user input. If the simulation is not ended (block 2912), control returns to block 2902 to continue the simulation. When the simulation is ended (block 2912), the example instructions 2900 end.

Figure 30:
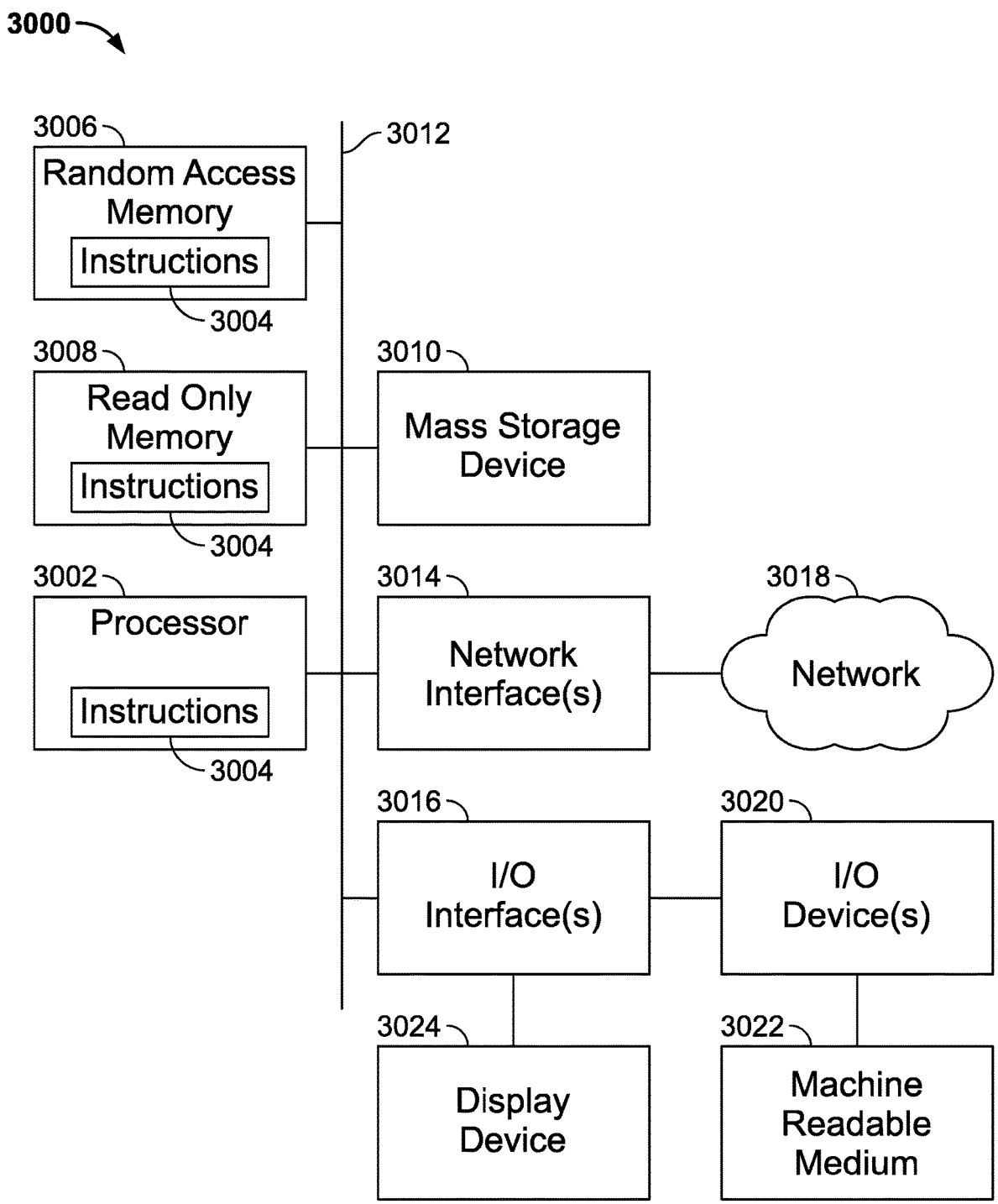
FIG. 30 is a block diagram of an example computing system that may be used to implement the example systems and methods disclosed herein.

FIG. 30 is a block diagram of an example computing system 3000 that may be used to implement the marker detector 202, the reference frame generator 204, the weld parameter detector 206, the weld solver 208, the simulation database 210, the slice manager 212, the cross-section renderer 214, the bead renderer 216, the feasibility analyzer 2502, the marker selector 2504, the visual marker generator 2506, the physical marker generator 2508 and/or, more generally, the simulator 102, the workpiece modeler 120, and/or the weld training system 100 of FIG. 1. The computing system 3000 may be, an integrated computing device, a computing appliance, a desktop, or all-in-one computer, a server, a laptop or other portable computer, a tablet computing device, a smartphone, and/or any other type of computing device.

The example computing system 3000 of FIG. 30 includes a processor 3002. The example processor 3002 may be any general purpose central processing unit (CPU) from any manufacturer. In some other examples, the processor 3002 may include one or more specialized processing units, such as RISC processors with an ARM core, graphic processing units, digital signal processors, and/or system-on-chips (SoC). In some examples, the computing system 3000 includes two or more processors. Two or more processors may executed separate sets of instructions to enable the two or more processors to define the same workpiece, and to simulate separate welding operations on different simulation domains simultaneously. Simulating the separate welding operations would enable multiple operators to simultaneously perform simulated welding operations on the same workpiece.

The processor 3002 executes machine readable instructions 3004 that may be stored locally at the processor (e.g., in an included cache or SoC), in a random access memory 3006 (or other volatile memory), in a read only memory 3008 (or other non-volatile memory such as FLASH memory), and/or in a mass storage device 3010. The example mass storage device 3010 may be a hard drive, a solid state storage drive, a hybrid drive, a RAID array, and/or any other mass data storage device.

A bus 3012 enables communications between the processor 3002, the RAM 3006, the ROM 3008, the mass storage device 3010, a network interface 3014, and/or an input/output interface 3016.

The example network interface 3014 includes hardware, firmware, and/or software to connect the computing system 3000 to a communications network 3018 such as the Internet. For example, the network interface 3014 may include IEEE 3002.X-compliant wireless and/or wired communications hardware for transmitting and/or receiving communications.

The example I/O interface 3016 of FIG. 30 includes hardware, firmware, and/or software to connect one or more input/output devices 3020 to the processor 3002 for providing input to the processor 3002 and/or providing output from the processor 3002. For example, the I/O interface 3016 may include a graphics processing unit for interfacing with a display device, a universal serial bus port for interfacing with one or more USB-compliant devices, a FireWire, a field bus, and/or any other type of interface. The example computing system 3000 includes a display device 3024 (e.g., an LCD screen) coupled to the I/O interface 3016. Other example I/O device(s) 3020 may include a keyboard, a keypad, a mouse, a trackball, a pointing device, a microphone, an audio speaker, an optical media drive, a multi-touch touch screen, a gesture recognition interface, a magnetic media drive, and/or any other type of input and/or output device.

The example computing system 3000 may access a non-transitory machine readable medium 3022 via the I/O interface 3016 and/or the I/O device(s) 3020. Examples of the machine readable medium 3022 of FIG. 30 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The present methods and systems may be realized in hardware, software, and/or a combination of hardware and software. The present methods and/or systems may be realized in a centralized fashion in at least one computing system, or in a distributed fashion in which different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A system to output a simulated welding result from a robotic welding operation, the system comprising:
 a robot;
 a physical welding implement connected to the robot;
 a physical workpiece; and
 a simulator configured to calculate a simulated welding result on the physical workpiece based on a communications output by the robot during a performance of the robotic welding operation with the physical welding implement, the simulated welding result comprising a simulated weld bead or a simulated weld joint;
 wherein the simulator is configured to evaluate the performance of the robotic welding operation, based on the simulated welding result, during the performance of the robotic welding operation; and
 wherein the robot and the simulator are configured to exchange command data in a bidirectional communication during the performance of the robotic welding operation, based on the evaluation of the simulator, wherein said command data is at least one instruction selected from a group of instructions comprising: starting or stopping welding with the physical welding implement, and starting or stopping a simulated flow of welding power, gas or electrode.

2. The system as defined in claim 1, wherein the simulator is configured to determine one or more weld parameters based on the communications output by the robot.

3. The system as defined in claim 1, further comprising a robot interpreter configured to convert communications from the robot to a simulator communication format.

4. The system as defined in claim 3, wherein the communications from the robot comprise a standardized field bus format.

5. The system as defined in claim 1, further comprising a robot controller configured to program the robot to execute the robotic welding operation.

6. The system as defined in claim 1, wherein the simulator is configured to calculate the simulated welding result for discrete slices of a simulation domain, the discrete slices comprising respective cross-sections of the physical workpiece.

7. The system as defined in claim 1, wherein the simulator is coupled to the robot using a welding power supply interface of the robot.

8. The system as defined in claim 1, wherein the simulator is configured to generate a visualization of the physical workpiece and the simulated weld bead or the simulated weld joint on the physical workpiece, at least one of during the simulated operation in a mixed reality environment or after the simulated operation in a fully digitalized environment.

9. The system as defined in claim 8, wherein the simulator is configured to transmit the simulated welding result to a remote device configured to provide a different perspective of the physical workpiece and the simulated weld bead or the simulated weld joint based on the simulated welding result.

10. The system as defined in claim 1, wherein the robot comprises a robotic arm.

11. The system as defined in claim 1, wherein the command data exchanged between the robot and the simulator further comprise one or more of the following instructions: starting and/or stopping a hardware driver; opening or closing a communication channel between the robot and the simulator; starting or stopping the robotic operation; data reading and/or code writing in the robot or the simulator; receiving or transmitting status information about the robot, the simulator or a simulated power supply.

12. The system as defined in claim 1, further comprising a robot interface configured to exchange the command data between the simulator and the robot.

13. The system as defined in claim 1, wherein the robot and the simulator are configured to mutually exchange the command data, and wherein the command data further comprise start data, stop data and code-writing data to, respectively, start, stop and modify the program routine of the hardware driver of the robot.

14. The system as defined in claim 1, further comprising:
an image sensor configured to capture images of the physical workpiece and the physical welding implement during the simulated operation; and wherein the simulator is further configured to calculate the simulated welding result based on the captured images.

15. The system as defined in claim 14, wherein the simulator is configured to determine one or more parameters of the simulated welding result based on interpreting visual markers in the captured images, and to calculate the simulated welding result based on the one or more parameters.

16. The system as defined in claim 14, wherein the simulator is configured to determine one or more parameters of the simulated welding result based on interpreting key points in the captured images, and to calculate the simulated welding result based on the one or more parameters.

17. The system as defined in claim 1, wherein the physical welding implement comprises a welding torch.

* * * * *